(12) United States Patent
Uchimura

(10) Patent No.: US 11,122,252 B2
(45) Date of Patent: Sep. 14, 2021

(54) IMAGE PROCESSING DEVICE, DISPLAY DEVICE, INFORMATION RECORDING MEDIUM, IMAGE PROCESSING METHOD, AND PROGRAM FOR VIRTUAL REALITY CONTENT

(71) Applicant: SONY CORPORATION, Tokyo (JP)

(72) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 363 days.

(21) Appl. No.: 16/064,403

(22) PCT Filed: Feb. 6, 2017

(86) PCT No.: PCT/JP2017/004179
§ 371 (c)(1),
(2) Date: Jun. 20, 2018

(87) PCT Pub. No.: WO2017/145721
PCT Pub. Date: Aug. 31, 2017

(65) Prior Publication Data
US 2019/0014306 A1    Jan. 10, 2019

(30) Foreign Application Priority Data
Feb. 26, 2016  (JP) .............................. JP2016-035428

(51) Int. Cl.
*H04N 13/189* (2018.01)
*H04N 5/93* (2006.01)
(Continued)

(52) U.S. Cl.
CPC .......... *H04N 13/189* (2018.05); *G11B 20/10* (2013.01); *G11B 27/105* (2013.01);
(Continued)

(58) Field of Classification Search
None
See application file for complete search history.

(56) References Cited

U.S. PATENT DOCUMENTS

| | | | |
|---|---|---|---|
| 2007/0046966 A1* | 3/2007 | Mussack | G06T 1/20 358/1.13 |
| 2016/0012855 A1* | 1/2016 | Krishnan | G11B 27/105 386/241 |
| 2017/0150139 A1* | 5/2017 | Lee | G06F 3/011 |

FOREIGN PATENT DOCUMENTS

| | | |
|---|---|---|
| JP | WO 2009/133714 A1 | 11/2009 |
| JP | 2010-093526 A | 4/2010 |

(Continued)

OTHER PUBLICATIONS

"White paper Blu-ray Disc Format", 2.B Audio Visual Application format Specifications for BD-ROM Version 2.4, May 2010 (Year: 2010).*

*Primary Examiner* — Stuart D Bennett
(74) *Attorney, Agent, or Firm* — Paratus Law Group, PLLC

(57) ABSTRACT

Depending on the type of an image stored in an information recording medium and display function information about a display device, an image to be displayed is acquired from a recording medium and output to the display device. A data processing unit configured to execute data reproduction from the information recording medium receives, from the display device configured to perform reproduction data display processing, image display function information such as type information about a VR image to be displayed, acquires, from a database file recorded on the information recording medium, VR identification information indicating which one of a VR image of type 1, a VR image of type 2, and non-VR image other than the VR images is included in the information recording medium, reads, from the infor- (Continued)

| | (A) VR IDENTIFICATION INFORMATION STORAGE FILE | (B) SPECIFIC EXAMPLES OF VR IDENTIFICATION INFORMATION |
|---|---|---|
| (1) | INDEX FILE (index. bdmv) | VR IMAGE TYPE INFORMATION (TYPE 1/TYPE 2) IS USED WHEN INFORMATION INDICATING WHETHER VR IMAGE IS INCLUDED OR NOT IS INCLUDED AS RECORDED DATA IN INFORMATION RECORDING MEDIUM |
| (2) | PLAYLIST FILE (PLAYLIST) | VR IMAGE TYPE INFORMATION (TYPE 1/TYPE 2) IS USED WHEN INFORMATION INDICATING WHETHER VR IMAGE IS INCLUDED OR NOT IS INCLUDED IN REPRODUCTION TARGET DATA IN PLAYLIST |
| (3) | CLIP INFORMATION FILE (CLIPINFO) | VR IMAGE TYPE INFORMATION (TYPE 1/TYPE 2) IS USED WHEN INFORMATION INDICATING WHETHER REPRODUCTION TARGET DATA ASSOCIATED WITH CLIP INFORMATION FILE INCLUDES VR IMAGE OR NOT IS INCLUDED | mation recording medium, image data that can be displayed on the display device based on a result of comparison between the acquired display device function information and VR identification information, and outputs the image data to the display device.

17 Claims, 38 Drawing Sheets

(51) Int. Cl.
| | | |
|---|---|---|
| H04N 5/91 | (2006.01) | |
| G11B 20/10 | (2006.01) | |
| G11B 27/10 | (2006.01) | |
| H04N 5/222 | (2006.01) | |
| H04N 5/262 | (2006.01) | |
| H04N 13/172 | (2018.01) | |
| H04N 13/167 | (2018.01) | |
| H04N 13/117 | (2018.01) | |
| H04N 13/139 | (2018.01) | |
| H04N 13/194 | (2018.01) | |
| H04N 5/232 | (2006.01) | |
| H04N 5/76 | (2006.01) | |

(52) U.S. Cl.
CPC ....... *H04N 5/2224* (2013.01); *H04N 5/23238* (2013.01); *H04N 5/2628* (2013.01); *H04N 5/7605* (2013.01); *H04N 5/91* (2013.01); *H04N 5/93* (2013.01); *H04N 13/117* (2018.05); *H04N 13/139* (2018.05); *H04N 13/167* (2018.05); *H04N 13/172* (2018.05); *H04N 13/194* (2018.05)

(56) References Cited

FOREIGN PATENT DOCUMENTS

| | | |
|---|---|---|
| JP | 2011-254239 A | 12/2011 |
| JP | 2014-096809 A | 5/2014 |
| JP | 2014-127001 A | 7/2014 |

* cited by examiner

FIG. 3
| (A) IMAGE TYPE | (B) IMAGE FEATURE | (C) IMAGE EXAMPLE |
|---|---|---|
| (1) TYPE 1 (Type1) | IMAGE INCLUDING COMBINATION OF MULTIPLE DIFFERENT VIEWPOINT IMAGES CONSTITUTING 360-DEGREE SURROUNDING IMAGE | 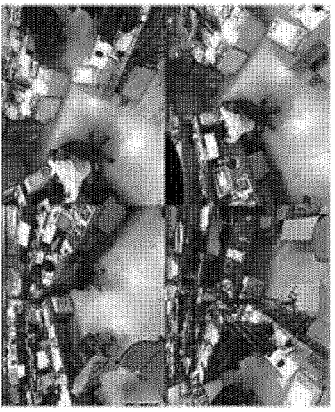 |
| (2) TYPE 2 (Type2) | IMAGE RECORDED BY DEVELOPING SURROUNDING IMAGE ON SPHERICAL SURFACE INTO PLANE |  |
| (..) .. | .. | .. |
| (n) TYPE n (Typen) | .. | .. |

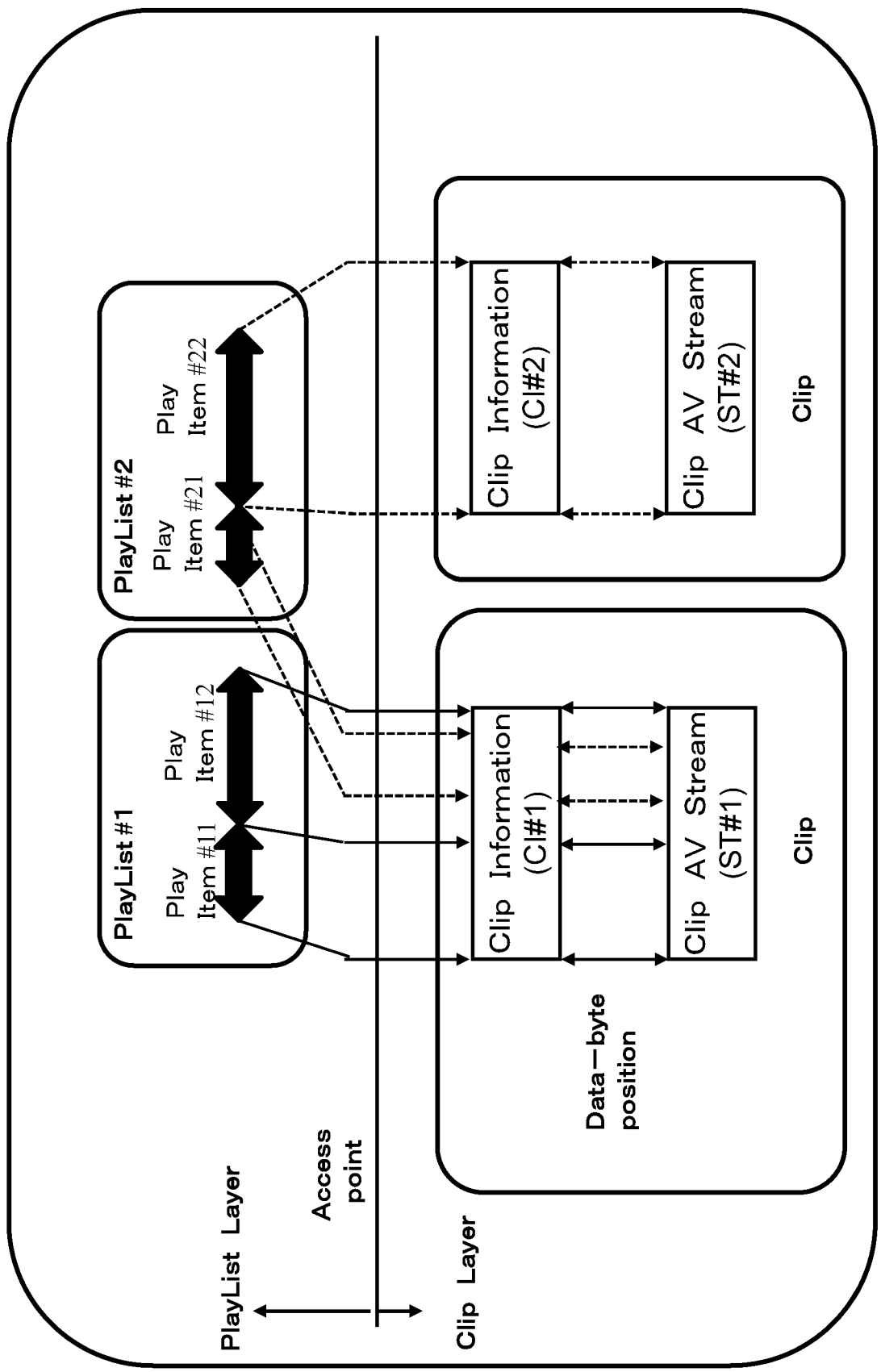

FIG. 7

| | (A) VR IDENTIFICATION INFORMATION STORAGE FILE | (B) SPECIFIC EXAMPLES OF VR IDENTIFICATION INFORMATION |
|---|---|---|
| (1) | INDEX FILE (index. bdmv) | VR IMAGE TYPE INFORMATION (TYPE 1/TYPE 2) IS USED WHEN INFORMATION INDICATING WHETHER VR IMAGE IS INCLUDED OR NOT IS INCLUDED AS RECORDED DATA IN INFORMATION RECORDING MEDIUM |
| (2) | PLAYLIST FILE (PLAYLIST) | VR IMAGE TYPE INFORMATION (TYPE 1/TYPE 2) IS USED WHEN INFORMATION INDICATING WHETHER VR IMAGE IS INCLUDED OR NOT IS INCLUDED IN REPRODUCTION TARGET DATA IN PLAYLIST |
| (3) | CLIP INFORMATION FILE (CLIPINFO) | VR IMAGE TYPE INFORMATION (TYPE 1/TYPE 2) IS USED WHEN INFORMATION INDICATING WHETHER REPRODUCTION TARGET DATA ASSOCIATED WITH CLIP INFORMATION FILE INCLUDES VR IMAGE OR NOT IS INCLUDED |

*FIG. 8*

| Index.bdmv{ | No. of bits | Mnemonic |
|---|---|---|
| type_indicator | 8*4 | bslbf |
| version number | 8*4 | bslbf |
| ... | | |
| AppInfoBDMV() | | |
| Indexes() | | |
| ExtensionData() | | |
| } | | |

101 braces {AppInfoBDMV(), Indexes(), ExtensionData()}

FIG. 9

| ID1 | ID2 | Data |
|---|---|---|
| 0x0001 | 0x0002 | LPCM Down convert INFORMATION |
| ... | | |
| 0x0004 | 0x0001 | VR IDENTIFICATION INFORMATION |

FIG. 10

| ExtensionData() { | No. of bits | Mnemonic |
|---|---|---|
| length | 32 | uimsbf |
| data_block_start_address | 32 | uimsbf |
| number_of_ext_data_entries | 8 | Uimsbf |
| for(i = 0; i < number_of_ext_data_entries; i++) | | |
|   ID1 ( 0x0004 ) | 16 | Uimsbf |
|   ID2 ( 0x0001 ) | 16 | Uimsbf |
|   ext_data_start_address | 32 | uimsbf |
|   ext_data_length | 32 | uimsbf |
| } | | |
| data_block() | | |
| } | | |

FIG. 11

(a) VR IDENTIFICATION INFORMATION RECORDED IN INDEX FILE

| data_block() { | No. of bits | Mnemonic |
|---|---|---|
| VR_type | 8 | bslbf |
| reserved_for_future_use | 32 | uimsbf |
| } | | |

{ 104 braces VR_type and reserved_for_future_use }

(b) VR IMAGE TYPE INFORMATION

| VR_type FIELD VALUE | MEANING |
|---|---|
| 0 | NO VR IMAGE IS INCLUDED |
| 1 | VR IMAGE OF TYPE 1 IS INCLUDED |
| 2 | VR IMAGE OF TYPE 2 IS INCLUDED |
| 3 | VR IMAGES OF TYPE 1 AND TYPE 2 ARE INCLUDED |
| ... | ... |

FIG. 12

| xxxxx.mpls{ | No. of bits | Mnemonic |
|---|---|---|
| type_indicator | 8*4 | bslbf |
| version number | 8*4 | bslbf |
| ... | | |
| AppInfoPlayList() | | |
| PlayList() | | |
| PlayListMark() | | |
| ExtensionData() | | |
| } | | |

| ExtensionData() { | No. of bits | Mnemonic |
|---|---|---|
| length | 32 | uimsbf |
| data_block_start_address | 32 | uimsbf |
| number_of_ext_data_entries | 8 | Uimsbf |
| for(i = 0; i < number_of_data_entries; i++) | | |
|   ID1 (0x0004) | 16 | Uimsbf |
|   ID2 (0x0002) | 16 | Uimsbf |
|   ext_data_start_address | 32 | uimsbf |
|   ext_data_length | 32 | uimsbf |
| } | | |
| data_block() | | |
| } | | |

122: ID1, ID2
123: data_block()

FIG. 14

(a) VR IDENTIFICATION INFORMATION RECORDED IN PLAYLIST

| data_block() { | No. of bits | Mnemonic |
|---|---|---|
| VR_type | 8 | uimsbf |
| reserved_for_future_use | 32 | uimsbf |
| } | | |

124 { VR_type, reserved_for_future_use }

(b) VR IMAGE TYPE INFORMATION

| VR_type FIELD VALUE | MEANING |
|---|---|
| 0 | NO VR IMAGE IS INCLUDED |
| 1 | VR IMAGE OF TYPE 1 IS INCLUDED |
| 2 | VR IMAGE OF TYPE 2 IS INCLUDED |
| 3 | VR IMAGES OF TYPE 1 AND TYPE 2 ARE INCLUDED |
| ... | ... |

FIG. 15

(a) VR IDENTIFICATION INFORMATION RECORDED IN PLAYLIST FILE

| data_block() { | No. of bits | Mnemonic |
|---|---|---|
| for(i=0;1<number_of_PlayItems; i++) | | |
| VR_type | 8 | uimsbf |
| reserved_for_future_use | 32 | uimsbf |
| } | | |

125 { (braces around VR_type and reserved_for_future_use)

(b) VR IMAGE TYPE INFORMATION

| VR_type FIELD VALUE | MEANING |
|---|---|
| 0 | NO VR IMAGE IS INCLUDED |
| 1 | VR IMAGE OF TYPE 1 IS INCLUDED |
| 2 | VR IMAGE OF TYPE 2 IS INCLUDED |
| 3 | VR IMAGE OF TYPE 3 IS INCLUDED |
| ... | ... |

FIG. 16

| xxxxx.mpls{ | No. of bits | Mnemonic |
|---|---|---|
| type_indicator | 8*4 | bslbf |
| version number | 8*4 | bslbf |
| ... | | |
| AppInfoPlayList() | | |
| PlayList() | | |
| PlayListMark() | | bslbf |
| ExtensionData() | | |
| } | | |

126 { (bracketing PlayList(), PlayListMark())

FIG. 17

| PlayList(){ | No. of bits | Mnemonic |
|---|---|---|
| length | 32 | uimsbf |
| reserved_for_future_use | 16 | bslbf |
| number_of_PlayItems | 16 | uimsbf |
| number_of_SubPaths | 16 | uimsbf |
| for (PlayItem_id = 0; PlayItem_id < number_of_PlayItems: PlayItem_id++) { | | |
| PlayItem() | | |
| } | | |
| ... | | |
| } | | |

| | No. of bits | Mnemonic |
|---|---|---|
| PlayItem(){ | | |
| length | 16 | uimsbf |
| Clip_Information_file_name[0] | 8*5 | bslbf |
| ... | | |
| STN_table() | | |
| ... | | |
| } | | |

128 { (bracing STN_table() row)

FIG. 19

| | No. of bits | Mnemonic |
|---|---|---|
| STN_table(){ | | |
| length | 16 | uimsbf |
| reserved_for_future_use | 16 | bslbf |
| number_of_primary_video_stream_entries | 8 | uimsbf |
| ... | | |
| for(primary_video_stream_id = 0; primary_video_stream_id < number_of_primary_video_stream_entries; primary_video_stream_id++) { | | |
|     stream_entry() | | |
|     stream_attributes() | | |
| } | | |
| ... | | |
| } | | |

129 ⎱ stream_entry()
130 ⎱ stream_attributes()

FIG. 20

(a) VR IDENTIFICATION INFORMATION RECORDED AS STREAM ATTRIBUTE OF STN TABLE CORRESPONDING TO PLAY ITEM IN PLAYLIST FILE

| | No. of bits | Mnemonic |
|---|---|---|
| stream_attributes(){ | | |
| length | 8 | uimsbf |
| stream_coding_type | 8 | bslbf |
| if (stream_coding_type) == 0x24 { //HEVC | | |
| ... | | |
| VR_type | 8 | bslbf |
| reserved_for_future_use | 7 | bslbf |
| } | | |
| ... | | |
| } | | |

(131 brace around VR_type and reserved_for_future_use)

(b) VR IMAGE TYPE INFORMATION

| VR_type FIELD VALUE | MEANING |
|---|---|
| 0 | NO VR IMAGE IS INCLUDED |
| 1 | VR IMAGE OF TYPE 1 IS INCLUDED |
| 2 | VR IMAGE OF TYPE 2 IS INCLUDED |
| 3 | VR IMAGE OF TYPE 3 IS INCLUDED |
| ... | ... |

FIG. 21

| xxxxx.clpi{ | No. of bits | Mnemonic |
|---|---|---|
| type_indicator | 8*4 | bslbf |
| version number | 8*4 | bslbf |
| ... | | |
| ClipInfo() | | |
| SequenceInfo() | | |
| ProgramInfo() | | |
| ... | | |
| ExtensionData() | | |
| } | | |

*FIG. 22*

| ExtensionData() { | No. of bits | Mnemonic |
|---|---|---|
| length | 32 | uimsbf |
| data_block_start_address | 32 | uimsbf |
| number_of_ext_data_entries | 8 | Uimsbf |
| for(i = 0; i < number_of_data_entries; i++) | | |
| ID1 (0x0004) | 16 | Uimsbf |
| ID2 (0x0003) | 16 | Uimsbf |
| ext_data_start_address | 32 | uimsbf |
| ext_data_length | 32 | uimsbf |
| } | | |
| data_block() | | |
| } | | |

142 { (ID1, ID2, ext_data_start_address, ext_data_length rows)
143 { (data_block() row)

FIG. 23

(a) VR IDENTIFICATION INFORMATION RECORDED IN CLIP INFORMATION FILE

| | No. of bits | Mnemonic |
|---|---|---|
| data_block() { | | |
| for(i=0;1<number_of_PlayItems; i++) | | |
|    VR_type | 8 | uimsbf |
|    reserved_for_future_use | 32 | uimsbf |
| } | | |

144 { VR_type, reserved_for_future_use }

(b) VR IMAGE TYPE INFORMATION

| VR_type FIELD VALUE | MEANING |
|---|---|
| 0 | NO VR IMAGE IS INCLUDED |
| 1 | VR IMAGE OF TYPE 1 IS INCLUDED |
| 2 | VR IMAGE OF TYPE 2 IS INCLUDED |
| 3 | VR IMAGE OF TYPE 3 IS INCLUDED |
| ... | ... |

FIG. 24

| xxxxx.clpi{ | No. of bits | Mnemonic |
|---|---|---|
| type_indicator | 8*4 | bslbf |
| version number | 8*4 | bslbf |
| ... | | |
| ClipInfo() | | |
| SequenceInfo() | | |
| ProgramInfo() | | |
| ... | | |
| ExtensionData() | | |
| } | | |

145 { ClipInfo()
146 { SequenceInfo()
147 { ProgramInfo()
148 { ExtensionData()

FIG. 25

| ProgramInfo{ | No. of bits | Mnemonic |
|---|---|---|
| length | 32 | uimsbf |
| number_of_program_sequences | 8 | bslbf |
| ... | | |
| for(i=0; i<number_of_program_sequences; i++) { | | |
| ... | | |
| number_of_streams_in_ps[i] | 8 | uimsbf |
| for(stream_index=0; i<number_of_streams_in_ps[i]; i++) { | | |
| ... | | |
| StreamCodingInfo(I, stream_index) | | |
| } | | |
| } | | |
| } | | |

(a) VR IDENTIFICATION INFORMATION RECORDED IN CLIP INFORMATION FILE

| StreamCodingInfo(i, stream_index){ | No. of bits | Mnemonic |
|---|---|---|
| length | 8 | uimsbf |
| stream_coding_type | 8 | bslbf |
| if(stream_coding_type == 0x24) //HEVC | | |
| ... | | |
| VR_type | 8 | bslbf |
| ... | | |
| } | | |
| ... | | |
| } | | |

150

(b) VR IMAGE TYPE INFORMATION

| VR_type FIELD VALUE | MEANING |
|---|---|
| 0 | NO VR IMAGE IS INCLUDED |
| 1 | VR IMAGE OF TYPE 1 IS INCLUDED |
| 2 | VR IMAGE OF TYPE 2 IS INCLUDED |
| 3 | VR IMAGE OF TYPE 3 IS INCLUDED |
| ... | ... |

FIG. 28

| Extended Tag code | MEANING OF Block |
|---|---|
| 0x0 | |
| 0x1 | |
| 0x2 | |
| ... | |
| 0x8 | VR type Data block |
| ... | |
| 0xFF | reserved |

(a) NON-VR-IMAGE-COMPLIANT DISPLAY DEVICE

| bit7 | 6 | 5 | 4 | 3 | 2 | 1 | 0 |
|---|---|---|---|---|---|---|---|
| 0 | 0 | 0 | 0 | 0 | 0 | 0 | 0 |

(b) DISPLAY DEVICE CAPABLE OF DISPLAYING VR IMAGE OF TYPE 1

| bit7 | 6 | 5 | 4 | 3 | 2 | 1 | 0 |
|---|---|---|---|---|---|---|---|
| 0 | 0 | 0 | 0 | 0 | 0 | 0 | 1 |

(c) DISPLAY DEVICE CAPABLE OF DISPLAYING VR IMAGE OF TYPE 2

| bit7 | 6 | 5 | 4 | 3 | 2 | 1 | 0 |
|---|---|---|---|---|---|---|---|
| 0 | 0 | 0 | 0 | 0 | 0 | 1 | 0 |

(d) DISPLAY DEVICE CAPABLE OF DISPLAYING VR IMAGE OF TYPE 1 AND VR IMAGE OF TYPE 2

| bit7 | 6 | 5 | 4 | 3 | 2 | 1 | 0 |
|---|---|---|---|---|---|---|---|
| 0 | 0 | 0 | 0 | 0 | 0 | 1 | 1 |

FIG. 32

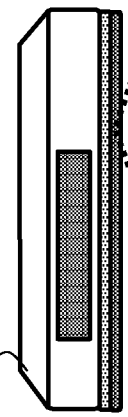

20 REPRODUCTION DEVICE

DATA (RECORDING IMAGE CONVERSION FUNCTION INFORMATION OF REPRODUCTION DEVICE) STORED IN STORAGE UNIT (PSR32)

| b7 | b6 | b5 | b4 | b3 | b2 | b1 | b0 |
|---|---|---|---|---|---|---|---|
| | | | | | | VR-IMAGE-OF-TYPE 2 CONVERSION FUNCTION | VR-IMAGE-OF-TYPE 1 CONVERSION FUNCTION |

(b31-b8 reserved)

| b2 | b1 | MEANING |
|---|---|---|
| 0 | 0 | NO VR IMAGE CONVERSION FUNCTION |
| 0 | 1 | CAPABLE OF CONVERTING ONLY VR IMAGE OF TYPE 1 |
| 1 | 0 | CAPABLE OF CONVERTING ONLY VR IMAGE OF TYPE 2 |
| 1 | 1 | CAPABLE OF CONVERTING VR IMAGES OF TYPES 1 AND 2 |

FIG. 33

(a) VR IDENTIFICATION INFORMATION RECORDED IN INFO FRAME

| field | MEANING |
|---|---|
| InfoFrame Type Code | InfoFrame Type=0X08 (INFO FRAME IDENTIFIER) |
| InfoFrame version number | 0x01 |
| Lengt of Info Frame | LENGTH OF INFO FRAME |
| Data Byte 1 | VR_type |
| ... | |
| Data Byte n | |

(Data Byte 1 ... Data Byte n: 231)

(b) VR IMAGE TYPE INFORMATION

| VR_type FIELD VALUE | MEANING |
|---|---|
| 0 | NO VR IMAGE IS INCLUDED |
| 1 | VR IMAGE OF TYPE 1 IS INCLUDED |
| 2 | VR IMAGE OF TYPE 2 IS INCLUDED |
| 3 | VR IMAGE OF TYPE 3 IS INCLUDED |
| ... | ... |

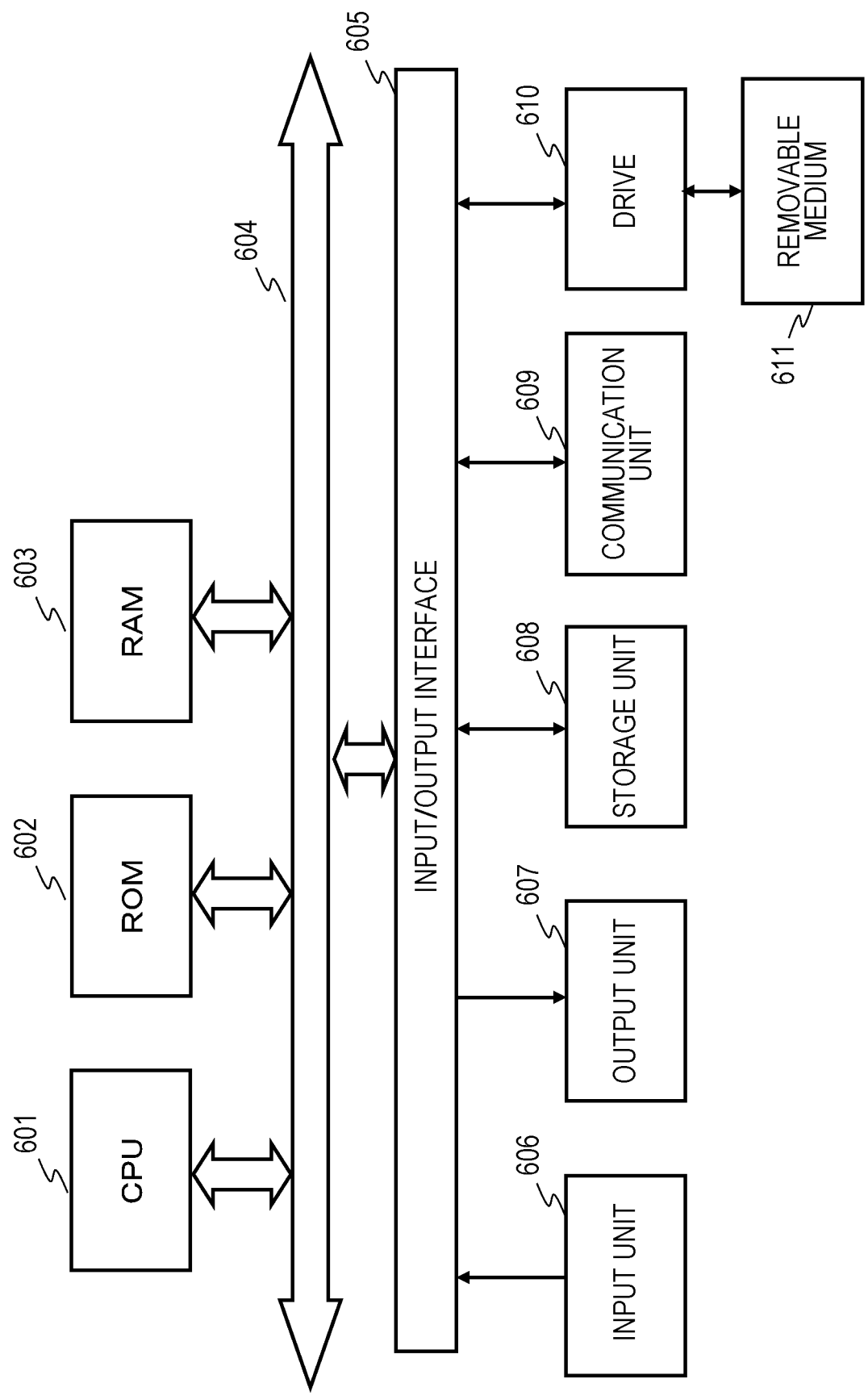

IMAGE PROCESSING DEVICE, DISPLAY DEVICE, INFORMATION RECORDING MEDIUM, IMAGE PROCESSING METHOD, AND PROGRAM FOR VIRTUAL REALITY CONTENT

CROSS REFERENCE TO PRIOR APPLICATION

This application is a National Stage Patent Application of PCT International Patent Application No. PCT/JP2017/004179 (filed on Feb. 6, 2017) under 35 U.S.C. § 371, which claims priority to Japanese Patent Application No. 2016-035428 (filed on Feb. 26, 2016), which are all hereby incorporated by reference in their entirety.

TECHNICAL FIELD

The present disclosure relates to an image processing device, a display device, an information recording medium, an image processing method, and a program. More particularly, the present invention relates to an image processing device, a display device, an information recording medium, an image processing method, and a program for performing control to cause a display device to accurately display images, such as a full-angle-of-view image, an omnidirectional image, or a panoramic image, which are images observable in various directions, depending on functions of the display device and the type of images.

BACKGROUND ART

Recently, an image capturing device capable of capturing images in various directions, such as a full-angle-of-view image, an omnidirectional image, or a panoramic image, has been developed, and a system in which images captured by such an image capturing device are displayed on a display unit of a PC, a tablet terminal, a mobile terminal, a head mount display (HMD), or the like, and images selected by a user or images automatically selected depending on the direction of the user can be observed has been widely used.

For example, in a PC or the like, video image (moving image) data on a surrounding 360-degree omnidirectional image can be acquired from an external server, or read from a recording medium, and displayed on a display device. A user can select an image in an arbitrary direction and display the image on a display device, and can observe images, such as a moving image and a still image, by freely changing a viewpoint.

Images to be displayed on the display unit of a PC, a tablet terminal, or a mobile terminal can be displayed by moving an observation direction by a mouse operation by a user, slide processing on a touch panel, flick processing, or the like. The user can easily enjoy images in various directions.

In the case of displaying images on a head mount display (HMD), images can be displayed depending on the direction of the head of a user according to sensor information for detecting the motion or direction of the head mounted on the HMD, and the user can experience such a feeling that the user exists in the image displayed on the display unit of the HMD.

Processing for displaying images on the display unit of the display device by clipping only a part of captured images in various directions is performed on the full-angle-of-view image, omnidirectional image, or panoramic image.

Note that Patent Document 1 (Japanese Patent Application Laid-Open No. 2014-127001) discloses a related art as processing for changing a display range by image processing.

At present, there are various methods as image recording or reproduction processing methods for recording and displaying a full-angle-of-view image, an omnidirectional image, or a panoramic image.

Accordingly, for example, in a case where panoramic image data of one method (method A) is recorded in a disk, and a reproduction device reads the panoramic image data of the method A from the disk and outputs the panoramic image data to a display device, if the display device does not include a program (display application) for displaying the panoramic image data of the method A, there is a problem that the panoramic image cannot be displayed.

CITATION LIST

Patent Document

Patent Document 1: Japanese Patent Application Laid-Open No. 2014-127001

SUMMARY OF THE INVENTION

Problems to be Solved by the Invention

The present disclosure has been made in view of, for example, the above-described problems, and an object of the present disclosure is to provide an image processing device, a display device, an information recording medium, an image processing method, and a program which perform control for accurately displaying an image, such as a full-angle-of-view image, an omnidirectional image, or a panoramic image, which enables observation of images in various directions, on a display device depending on a function or image type of the display device.

Solutions to Problems

A first aspect of the present disclosure is an image processing device including a data processing unit configured to execute reproduction processing for recorded data on an information recording medium. The data processing unit receives, from a display device configured to perform display processing on reproduction data supplied from the information recording medium, display device information including display function information about a virtual reality (VR) image, the VR image enabling selective display of images in different directions. The data processing unit acquires, from a database file recorded on the information recording medium, VR identification information indicating whether or not image data recorded on the information recording medium includes the VR image. The data processing unit reads, from the information recording medium, image data that can be displayed on the display device on the basis of a result of comparison between the display device information and the VR identification information, and outputs the image data to the display device.

Further, a second aspect of the present disclosure is an image processing device including a data processing unit configured to execute data recording on an information recording medium. The data processing unit generates a database file storing VR identification information indicating which one of virtual reality (VR) images of type 1 and type 2, and a non-VR image other than the VR images is included as recording image data on the information recording medium, and records the database file on the information recording medium, the VR images enabling selective display of images in different directions.

Further, a third aspect of the present disclosure is an information recording medium including: a reproduction data file storing image data; and a database file storing VR identification information as recorded data, the VR identification information indicating which one of virtual reality (VR) images of type 1 and type 2, and a non-VR image other than the VR images is included as image data stored in the reproduction data file, the VR images enabling selective display of images in different directions. A reproduction device is capable of selectively reproducing image data of a type suitable for a display function of a display device configured to display reproduction data by referring to the VR identification information.

Further, a fourth aspect of the present disclosure is a display device including: a communication unit configured to execute data transmission to/reception from a reproduction device configured to execute reproduction processing for recorded data on an information recording medium; and a data processing unit. The data processing unit generates display device information including display function information about a virtual reality (VR) image and outputs the display device information to the reproduction device, the VR image enabling selective display of images in different directions.

Further, a fifth aspect of the present disclosure is an image processing method to be executed in an image processing device, the image processing device including a data processing unit configured to execute reproduction processing for recorded data on an information recording medium. The data processing unit receives, from a display device configured to perform display processing on reproduction data supplied from the information recording medium, display device information including display function information about a virtual reality (VR) image, the VR image enabling selective display of images in different directions. The data processing unit acquires, from a database file recorded on the information recording medium, VR identification information indicating whether or not image data recorded on the information recording medium includes the VR image. The data processing unit reads, from the information recording medium, image data that can be displayed on the display device on the basis of a result of comparison between the display device information and the VR identification information, and outputs the image data to the display device.

Further, a sixth aspect of the present disclosure is an image processing method to be executed in an image processing device, the image processing device including a data processing unit configured to execute data recording on an information recording medium. The data processing unit generates a database file storing VR identification information indicating which one of virtual reality (VR) images of type 1 and type 2, and a non-VR image other than the VR images is included as recording image data on the information recording medium, and records the database file on the information recording medium, the VR images enabling selective display of images in different directions.

Further, a seventh aspect of the present disclosure is an image processing method to be executed in a display device, the display device including: a communication unit configured to execute data transmission to/reception from a reproduction device configured to execute reproduction processing for recorded data on an information recording medium; and a data processing unit. The data processing unit generates display device information including display function information about a virtual reality (VR) image and outputs the display device information to the reproduction device, the VR image enabling selective display of images in different directions.

Further, an eighth aspect of the present disclosure is a program for causing an image processing device to execute information processing, the image processing device including a data processing unit configured to execute reproduction processing for recorded data on an information recording medium, the program causes the data processing unit to execute: processing for receiving, from a display device configured to perform display processing on reproduction data supplied from the information recording medium, display device information including display function information about a virtual reality (VR) image, the VR image enabling selective display of images in different directions; processing for acquiring, from a database file recorded on the information recording medium, VR identification information indicating whether or not image data recorded on the information recording medium includes the VR image; and processing for reading, from the information recording medium, image data that can be displayed on the display device on the basis of a result of comparison between the display device information and the VR identification information, and outputting the image data to the display device.

Further, a ninth aspect of the present disclosure is a program for causing an image processing device to execute information processing, the image processing device including a data processing unit configured to execute data recording on an information recording medium, the program causing the data processing unit to execute processing for generating a database file storing VR identification information indicating which one of virtual reality (VR) images of type 1 and type 2, and a non-VR image other than the VR images is included as recording image data on the information recording medium, and recording the database file on the information recording medium, the VR images enabling selective display of images in different directions.

Further, a tenth aspect of the present disclosure is a program for causing a display device to execute image processing, the display device including: a communication unit configured to execute data transmission to/reception from a reproduction device configured to execute reproduction processing for recorded data on an information recording medium; and a data processing unit. The program causing the data processing unit to execute processing for generating display device information including display function information about a virtual reality (VR) image and outputs the display device information to the reproduction device, the VR image enabling selective display of images in different directions.

Note that the program according to the present disclosure is a program that can be provided in a computer-readable format by a storage medium or a communication medium to, for example, an image processing device or a computer system capable of executing various programs or codes. The provision of such a program in a computer-readable format enables implementation of processing according to the program on the image processing device or the computer system.

Other objects, features, and advantages of the present disclosure will become apparent from the following detailed description based on embodiments of the present disclosure described below and accompanying drawings. Note that the system described herein refers to a logical set of a plurality of devices and is not limited to a configuration in which devices having the respective configurations are present in the same casing.

Effects of the Invention

According to a configuration of an embodiment of the present disclosure, an image to be displayed is acquired from a recording medium according to an image type stored in an information recording medium and display function information about a display device, and the image is output to the display device.

Specifically, a data processing unit the executes data reproduction from an information recording medium inputs image display function information, such as type information about a VR image to be displayed from a display device that performs reproduction data display processing, acquires, from a database file recorded on the information recording medium, VR identification information indicating which one of a VR image of type 1, a VR image of type 2, and a non-VR image other than the VR images is included in the information recording medium, reads, from the information recording medium, image data that can be displayed on the display device on the basis of a result of comparison between the acquired display device function information and VR identification information, and outputs the image data to the display device.

This configuration enables implementation of a configuration for acquiring an image to be displayed from a recording medium according to an image type stored in the information recording medium and display function information about the display device, and outputting the image to the display device.

Note that advantageous effects described herein are illustrated by way of example only and are not particularly limited. Additional advantageous effects may be provided.

BRIEF DESCRIPTION OF DRAWINGS

FIG. 3 is a diagram illustrating a plurality of image types.

FIG. 6 is a diagram illustrating the correspondence between reproduction data and a playlist defined in the BDMV format.

FIG. 7 is a diagram illustrating a storage file and storage data of VR identification information.

FIG. 8 is a diagram illustrating a data configuration of an index file.

FIG. 9 is a diagram illustrating an identifier corresponding to extension data recorded on an extension data recording area of the index file.

FIG. 10 is a diagram illustrating a data configuration of the extension data recording area of the index file.

FIG. 11 is a diagram illustrating an example of VR identification information recorded on the extension data recording area of the index file.

FIG. 12 is a diagram illustrating a data configuration of a playlist file.

FIG. 13 is a diagram illustrating a data configuration of an extension data recording area of the playlist file.

FIG. 14 is a diagram illustrating an example of VR identification information recorded on the extension data recording area of the playlist file.

FIG. 15 is a diagram illustrating VR identification information recorded on the extension data recording area of the playlist file.

FIG. 16 is a diagram illustrating VR identification information recorded on a play item unit of the playlist file.

FIG. 17 is a diagram illustrating VR identification information recorded on the play item unit of the playlist file.

FIG. 18 is a diagram illustrating VR identification information recorded on the play item unit of the playlist file.

FIG. 19 is a diagram illustrating VR identification information recorded on the play item unit of the playlist file.

FIG. 20 is a diagram illustrating VR identification information recorded on the play item unit of the playlist file.

FIG. 21 is a diagram illustrating a data configuration of an extension data recording area of a clip information file.

FIG. 22 is a diagram illustrating an example of VR identification information recorded on the extension data recording area of the clip information file.

FIG. 23 is a diagram illustrating VR identification information recorded on the extension data recording area of the clip information file.

FIG. 24 is a diagram illustrating an example in which VR identification information is recorded on a stream coding information recording field of the clip information file.

FIG. 25 is a diagram illustrating an example in which VR identification information is recorded on the stream coding information recording field of the clip information file.

FIG. 26 is a diagram illustrating an example in which VR identification information is recorded on the stream coding information recording field of the clip information file.

FIG. 28 is a diagram illustrating a specific example of display device function information (EDID) to be transmitted from the display device to the reproduction device.

FIG. 29 is a diagram illustrating a specific example of the display device function information (EDID) to be transmitted from the display device to the reproduction device.

FIG. 32 is a diagram illustrating an example in which image conversion function information is recorded on the storage unit (PSR) in the reproduction device.

FIG. 33 is a diagram illustrating a data configuration of an info frame as reproduction data information to be transmitted from the reproduction device to the display device.

FIG. 38 is a diagram illustrating a hardware configuration example of an information processing device to be applied to processing according to the present disclosure.

MODE FOR CARRYING OUT THE INVENTION

Figure 1:
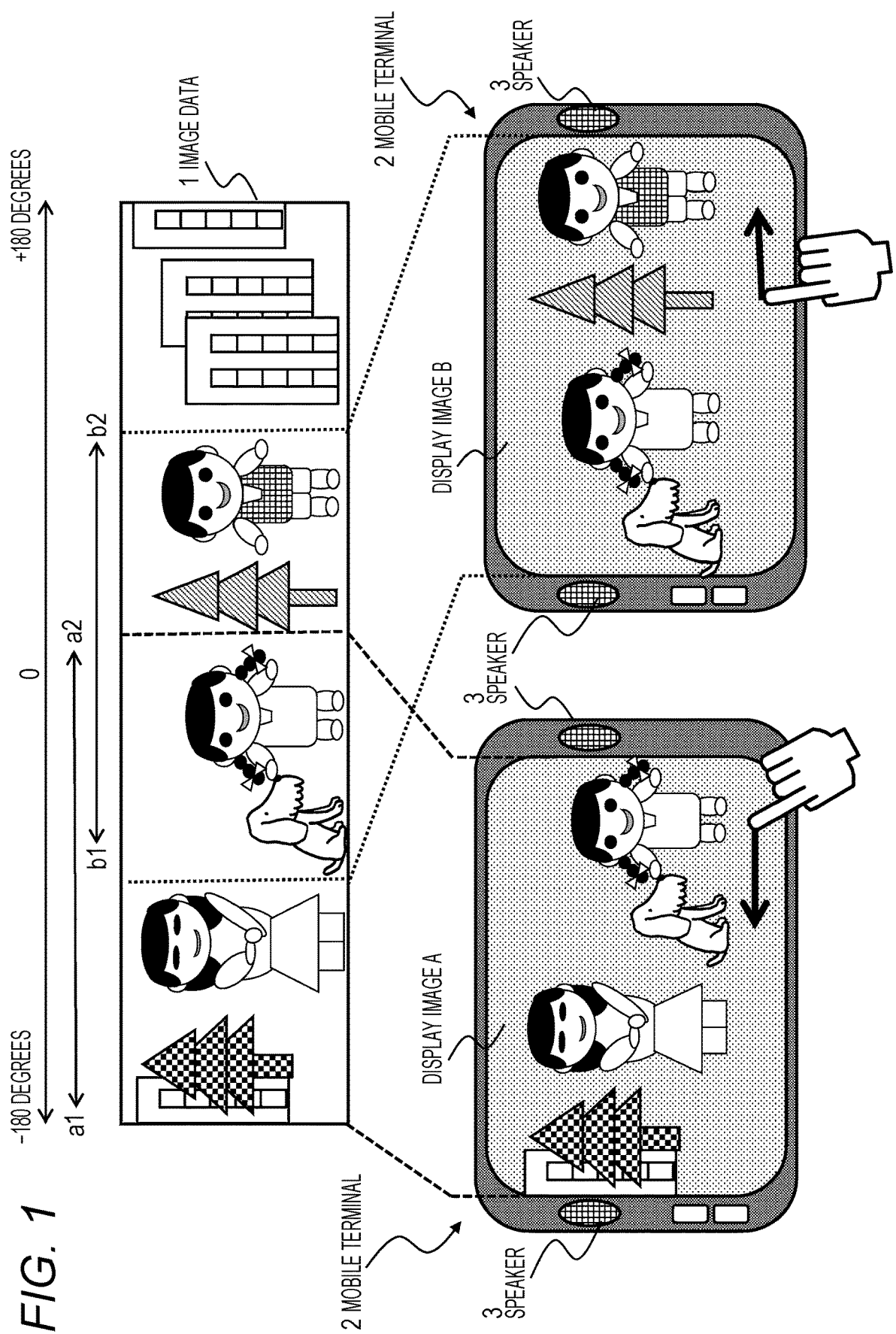
FIG. 1 is a diagram illustrating a VR image such as a panoramic image.

An image processing device, a display device, an information recording medium, an image processing method, and a program according to the present disclosure will be described in detail below with reference to the drawings. Note that the following description is made according to the items described below.

1. Regarding the outline of image display processing
2. Regarding a plurality of image types, image reproduction, and a configuration for display processing
3. Regarding an example of an identification information recording configuration for image data recorded on an information recording medium
   3-1. Regarding the outline of recorded data on the information recording medium
   3-2. Regarding an example of recording VR identification information in an index file
   3-3. Regarding an example of recording VR identification information in a playlist file
   3-4. Regarding an example of recording VR identification information of a play item unit in the playlist file
   3-5. Regarding an example of recording VR identification information in a clip information file
   3-6. Regarding an example of recording VR identification information in a stream coding information recording field of the clip information file
4. Regarding an example of a configuration for inputting and outputting information between the reproduction device and the display device
   4-1. Regarding display device information to be transmitted to the reproduction device by the display device
   4-2. Regarding reproduction data information to be transmitted to the display device by the reproduction device
5. Regarding the configuration and processing of the image processing device that executes data recording processing on the information recording medium
6. Regarding the configuration and processing of the image processing device that executes data reproduction processing from the information recording medium
7. Regarding a configuration example of the image processing device
8. Summary of the configuration of the present disclosure

1. Regarding the Outline of Image Display Processing

Referring first to FIG. 1 and the subsequent figures, the outline of image display processing in a device capable of causing a display unit to display images in various directions, such as a full-angle-of-view image, an omnidirectional image, or a panoramic image will be described.

As described above, recently, an image capturing device capable of capturing images in various directions, such as a full-angle-of-view image, an omnidirectional image, or a panoramic image, has been developed, and a system in which images captured by such an image capturing device are displayed on a display unit of a PC, a tablet terminal, a mobile terminal, a head mount display (HMD), or the like, and images selected by a user in an arbitrary direction can be observed has been widely used.

For example, video image (moving image) data on an omnidirectional image as a 360-degree surrounding image can be acquired from a recording medium or an external server and displayed on a display device of a PC, a television, or a mobile terminal such as a smartphone of a user. The user selects an image in an arbitrary direction from image data acquired from, for example, a recording medium, and display the image on the display device, thereby enabling the user to observe a video image (moving image) or a still image while freely changing a viewpoint through an operation, such as an input via a mouse or a remote controller, or touch slide processing on a display panel.

FIG. 1 is a diagram illustrating an example in which images in various directions are selected and displayed on a display unit of a mobile terminal.

Image data 1 illustrated in FIG. 1 is a panoramic image. A horizontal 360-degree image is set as one piece of image data.

Assuming that an image in which a central portion of the image data indicates a front direction (e.g., 0 degrees=north direction) of a user (observer) is used, a left end of the image data 1 indicates an image in a back direction (−180 degrees=south direction) of the user (observer) and a right end of the image data 1 indicates an image in the back direction (+180 degrees=south direction) of the user (observer).

The left end and the right end of the image data 1 indicate images at the same position.

Note that in the case of using a full-angle-of-view image, an omnidirectional image, or a 360-degree panoramic image, a 180-degree image is captured in the vertical direction and the image includes an image in all of the upper, lower, left, and right directions.

Note that in the following description, an image that enables selective display of images in various directions, such as a full-angle-of-view image, an omnidirectional image, or a panoramic image is referred to as a virtual reality (VR) image (virtual reality image).

A lower part of FIG. 1 illustrates a mobile terminal 2 as an example of an image processing device of a user.

On a display unit of the mobile terminal 2, an image in a partial area of the image data 1, for example, an image in an area arbitrarily selected by the user can be displayed.

A display image A on the left-side mobile terminal 2 is an area image in partial image sections a1 to a2 of a partial area in the image data 1.

A display image B on the right-side mobile terminal 2 is an area image in partial image sections b1 to b2 of a partial area in the image data 1.

The user moves the display image by performing finger slide processing or the like on the display unit configured as a touch panel, thereby enabling display of an image in an arbitrary area.

Note that the mobile terminal 2 includes a speaker 3 and outputs recorded audio data as well as the display image.

Figure 2:
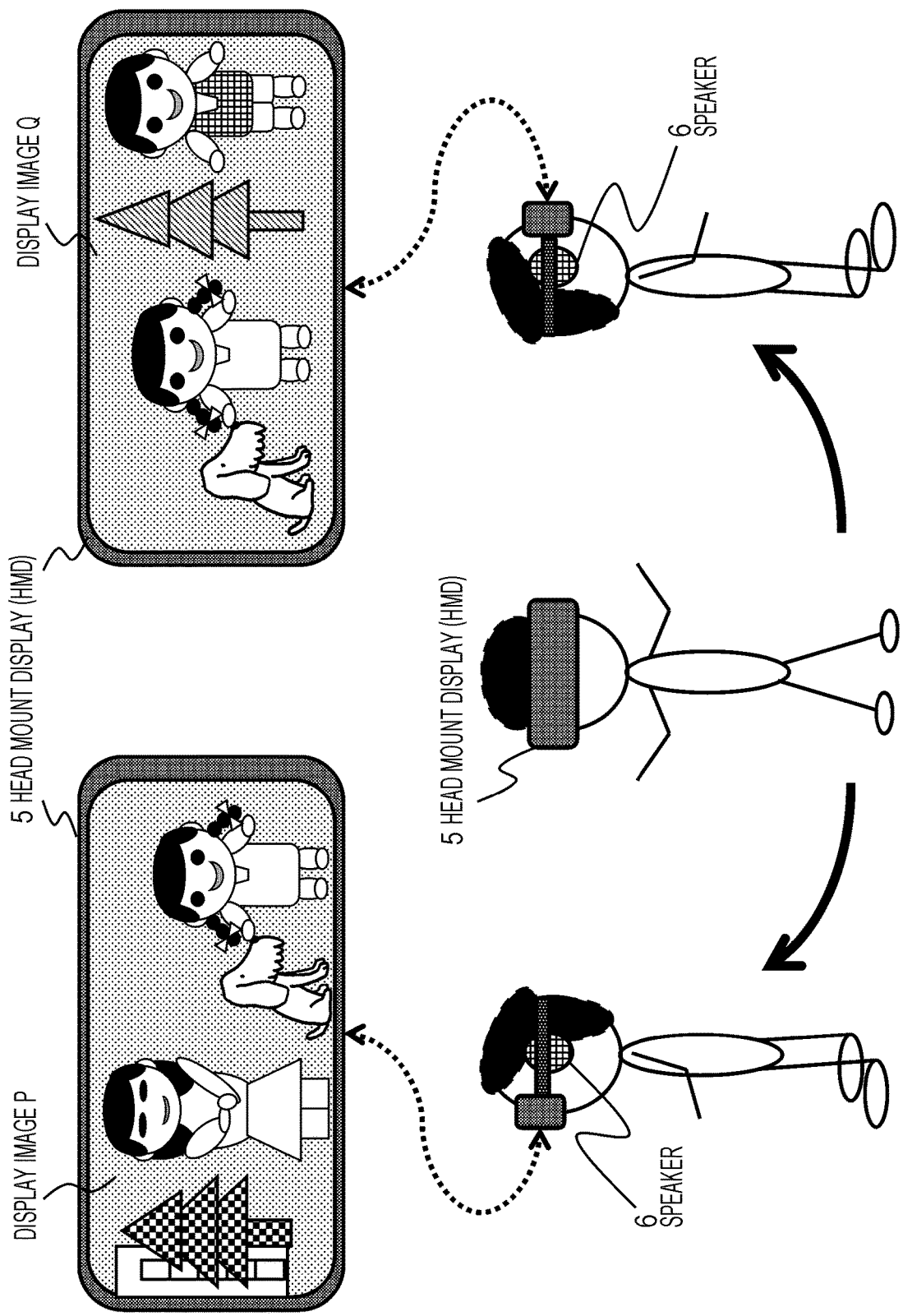
FIG. 2 is a diagram illustrating a VR image such as a panoramic image.

FIG. 2 illustrates an example of displaying a panoramic image by using the head mount display (HMD) 5.

In the case of displaying an image on the head mount display (HMD) 5, an image according to the direction of the head of the user is displayed depending on information from a sensor for detecting the motion or direction of the head wearing the HMD. This image display control enables the user to experience such a feeling that the user exists in the image displayed on the display unit of the HMD.

An image captured when the user wearing the user wearing an HMD 5 faces left is referred to as a display image P.

An image captured when the user wearing HMD 5 faces right is referred to as a display image Q.

The user wearing HMD 5 can observe a 360-degree surrounding image by changing the direction of his/her body (head).

Note that the head mount display (HMD) 5 also includes a speaker 6 and outputs recorded audio data as well as the display image.

2. Regarding a Plurality of Image Types, Image Reproduction, and a Configuration for Display Processing Next, a recording/reproducing method and a reproduction and display processing configuration for a virtual reality (VR) image (virtual reality image) such as a full-angle-of-view image, an omnidirectional image, or a panoramic image will be described.

There are various methods as image recording or reproduction processing methods for recording and displaying a VR image such as a full-angle-of-view image, an omnidirectional image, or a panoramic image.

Specifically, VR images include a plurality of image types (VR types) with different algorithms to be applied to recording processing and display processing on the VR images.

A specific image type (VR type) example will be described with reference to FIG. 3.

FIG. 3 illustrates two image types as representative examples of the VR image type.

(1) Type 1 (Type1) represents an image including a combination of a plurality of different viewpoint images constituting a 360-degree surrounding image as described in "(b) image feature", and includes a combination of images captured from, for example, four different viewpoints as illustrated in "(c) image example".

(2) Type 2 (Type2) represents an image obtained by developing a surrounding image on a spherical surface into a plane and recording the image as described in "(b) image feature", and includes one image obtained by developing an image on a spherical surface into a planar shape as described in "(c) image example".

Thus, the VR images include various types and the format of recorded data varies depending on the types. In addition, also in the display processing, it is necessary to execute different display image generation processing corresponding to each image type.

For example, in order to display the image of type 1, data processing to which a display application (program) for executing a display image generation algorithm compatible with the image of type 1 is applied is required.

In order to display the image of type 2, data processing to which a display application (program) for executing a display image generation algorithm compatible with the image of type 2 is applied is required.

Even when the image of type 2 is input to the display device including the image display application of type 1, it is difficult to perform the image display accurately.

Similarly, even when the image of type 1 is input to the display device including the image display application of type 2, it is difficult to perform the image display accurately.

Note that the VR images include a plurality of different types in addition to the types 1 and 2 described above.

Figure 4:
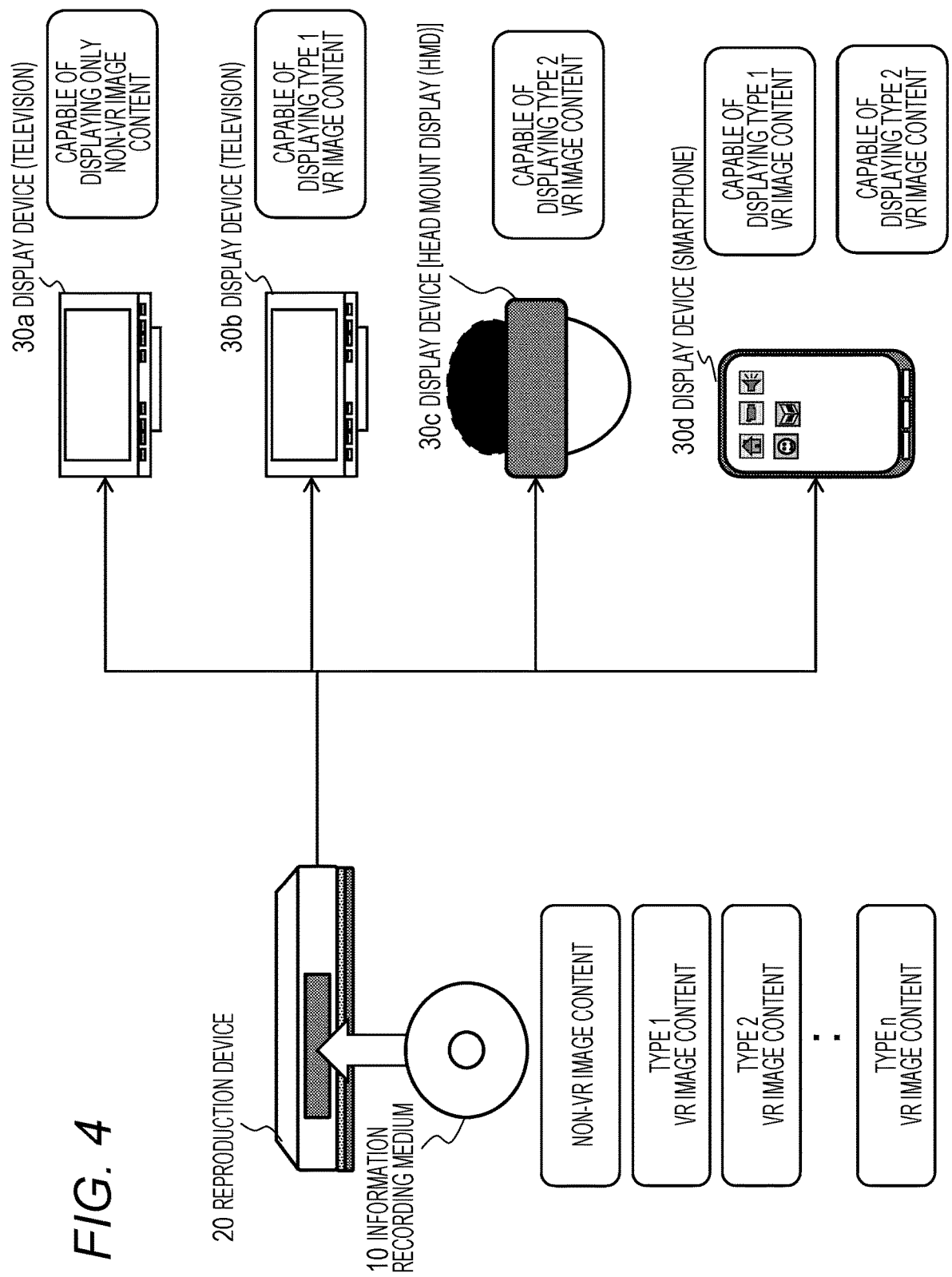
FIG. 4 is a diagram illustrating a combination of an information recording medium, a reproduction device, and a display device.

FIG. 4 illustrates a connection example of an information recording medium 10 recording a VR image, a reproduction device 20, and display devices 30*a* to 30*d* such as televisions on which the VR image is displayed.

The information recording medium 10 stores is, for example, a BD (Blu-ray Disc), and stores images of any one of the following types:

(1) A content of a non-VR image other than VR images;
(2) A content of a VR image of type 1;
(3) A content of a VR image of type 2; and:
(n) A VR content of type n.

Note that a content of a non-VR image other than VR images refers to a content of a two-dimensional image captured from one general camera viewpoint.

The display devices 30*a* to 30*d* connected to the reproduction device 20 are display devices as described below.

(1) Display device 30*a*: a non-VR-image-compliant television
(2) Display device 30*b*: a type 1-VR image-compliant television
(3) Display device 30*c*: a type 2-VR image-compliant head mount display (HMD)
(4) Display device 30*d*: a type 1&2-VR image-compliant smartphone (1) The display device 30*a*: the non-VR-image-compliant television is capable of displaying only non-VR images other than VR images, i.e., two-dimensional images captured from one general camera viewpoint.

(2) The display device 30*b*: the type 1-VR image-compliant television is capable of displaying the VR image of type 1 and non-VR images other than VR images.

Note that the non-VR images can be displayed on all display devices.

(3) The display device 30*c*: the type 2-VR image-compliant head mount display (HMD) is capable of displaying the VR image of type 2 and non-VR images other than VR images.

(4) The display device 30*d*: the type 1&2-VR image-compliant smartphone is capable of displaying the VR images of type 1 and type 2 and non-VR images other than VR images.

In this setting, assume that, for example, the reproduction device 20 reproduces the VR image of type 1 recorded on the information recording medium and outputs the VR 10 image of type 1 to the display device 30*c*: the type 2-VR image-compliant head mount display (HMD).

The display device 30*c* does not include any application for performing display processing for the VR image of type 1, resulting in a situation where the VR image of type 1 cannot be accurately displayed.

In the configuration illustrated in FIG. 4, processing that is required for the reproduction device (BD player) 20 to reproduce image data recorded on the information recording medium 10 such as a BD (Blu-ray□ Disc) and required for the display devices 30*a* to 30*d* to perform normal image display is, for example, the following processing.

(1) The reproduction device 20 confirms which one of the types of image data recorded on the mounted information recording medium (BD) 10, i.e., which one of the VR image of type 1, the VR image of type 2, and non-VR images of other than VR images, is recorded.

(2) The reproduction device 20 confirms which one of the types of image data that can be displayed on the display device connected to the reproduction device, i.e., which one of the VR image of type 1, the VR image of type 2, and non-VR images of other than VR images, can be displayed.

(3) The display devices 30*a* to 30*d* confirm which one of the types of image data of the VR image of type 1, the VR image of type 2, and non-VR images of other than VR images corresponds to data input from the reproduction device 20.

The above-described confirmation processings (1) to (3) are executed before the image data is output from the reproduction device 20 to the display devices 30*a* to 30*d*, thereby enabling normal reproduction and display processing depending on each image type.

Note that in a case where it is configured through the above-described confirmation processings (1) to (3) that the image type of data stored in the BD 10 mounted on the reproduction device 20 does not match the image type that can be displayed on the display devices 30a to 30d connected to the reproduction device 20, the reproduction device 20 can take measures such as outputting a message or the like indicating that the normal image display cannot be executed on the display devices 30a to 30d.

Note that the processing according to the present disclosure can be applied not only to two types of VR images, but also to any number of types. However, the following description is made assuming that two types (type 1 and type 2) of VR images are mainly used in the processing, for ease of explanation.

A specific configuration example for enabling implementation of the above-described confirmation processings (1) to (3) will be described.

3. Regarding an Example of an Identification Information Recording Configuration for Image Data Recorded on an Information Recording Medium First, an example of the identification information recording configuration for image data recorded on an information recording medium will be described.

As described above with reference to FIG. 4, in order to implement a normal image display on the display device 30, it is necessary for the reproduction device 20 to confirm which one of the type of image data recorded on the mounted information recording medium (BD) 10, i.e., which one of a VR image of type 1, a VR image of type 2, and a non-VR image other than the VR images, is recorded.

A configuration example of recording, on the information recording medium, identification information about image data recorded on the information recording medium will be described below as a configuration for enabling the confirmation processing.

[3-1. Regarding the outline of recorded data on the information recording medium]

First, the outline of recorded data on the information recording medium will be described.

Figure 5:
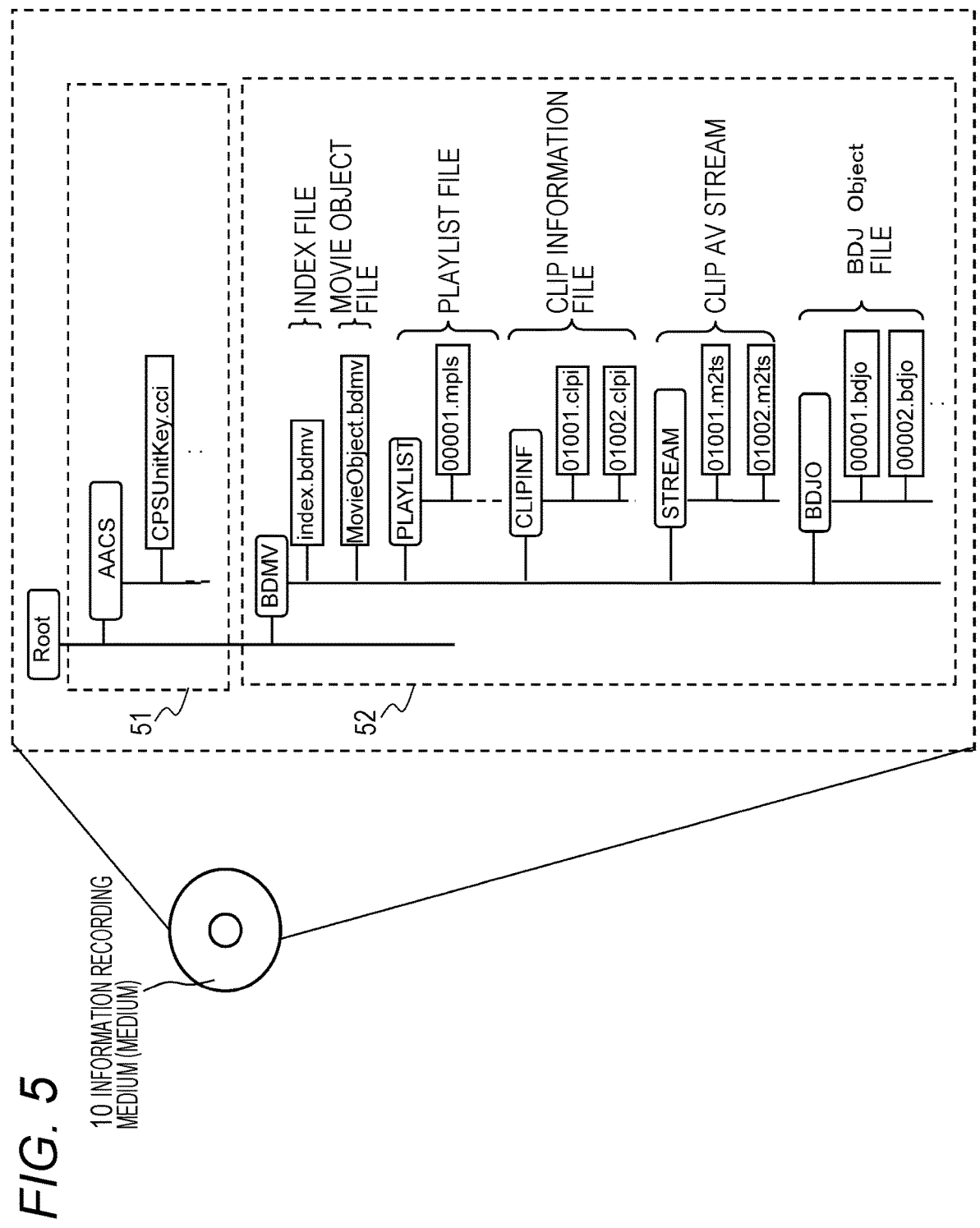
FIG. 5 is a diagram illustrating a directory configuration example of data to be recorded on a medium according to a BDMV format.

FIG. 5 illustrates a diagram illustrating a directory of recorded data according to a BDMV format recorded on the information recording medium 10 such as a ROM-type BD (Blu-ray□ Disc), for example.

The directory is separated into a management information setting unit 51 (AACS directory) and a data unit 52 (BDMV directory) as illustrated in FIG. 5.

The management information setting unit 51 (AACS directory) stores a CPS unit key file as a data encryption key, a use control information file, and the like.

The CPS unit key file stores a CPS unit key as encryption key data to be applied to decoding of encrypted data as reproduction target data stored in a clip AV stream file.

The reproduction device acquires a CPS unit key from the CPS unit key file by the processing to which a device key stored in the reproduction device, or data stored in a disk is applied, and decodes encrypted data stored in the clip AV stream file by applying the acquired CPS unit key, thereby performing the reproduction processing.

On the other hand, the BDMV directory and subsequent directories of the data unit 52 record, for example, the following files:

an index file;
a playlist file;
a clip information file;
a clip AV stream file; and
a BDJO file.

The index file stores management information and the like corresponding to the entire data stored in a disk, such as title information, as index information to be applied to the reproduction processing.

The playlist file is a file that defines a content reproduction order or the like according to program information about a reproduction program designated by a title, and includes, for example, designation information and the like about the clip information file recording reproduction position information or the like.

The clip information file is a file designated by the playlist file, and includes, for example, reproduction position information about the clip AV stream file and the like.

The clip AV stream file is a file storing AV stream data to be reproduced. The clip AV stream file includes packets storing data on an image, audio, caption, or the like, to be reproduced.

The BDJO file is a file storing execution control information about a file storing a JAVA□ program, command, or the like.

Note that the data files, such as the index file, the playlist file, and the clip information file, are files storing management information, reproduction control information, reproduction data attribute information, and the like to be applied to reproduction processing for an image, audio, caption, or the like, as reproduction data stored in the clip AV stream file, and such files are referred to as a database file.

A sequence for the information processing device to reproduce a content recorded on the information recording medium is as follows.

(a) First, the reproduction application designates a specific title from the index file.

(b) A reproduction program associated with the designated title is selected.

(c) A playlist defining a content reproduction order or the like is selected according to program information about the selected reproduction program.

(d) An AV stream or command is read out as content actual data according to clip information defined in the selected playlist, and processing for reproducing the AV stream and executing the command is carried out.

FIG. 6 is a diagram illustrating a correspondence relationship among the following pieces of data to be recorded on the information recording medium (medium) 10. That is,
a playlist file,
a clip information file, and
a clip AV stream file.

AV streams including reproduction target data, such as an image, audio, and caption, which are actual reproduction target data, are recorded as a clip AV stream file, and define management information for these AV streams, and a playlist file and a clip information file as a reproduction control information file.

As illustrated in FIG. 6, the files in these multiple categories can be classified into the following two layers:
a playlist layer including a playlist file, and
a clip layer including a clip AV stream file and a clip information file.

Note that one clip AV stream file is associated with one clip information file, and a pair of these files is considered to be an object and these files are collectively referred to as a clip or a clip file.

Management information such as an EP map recording data detailed information included in the clip AV stream file, such as I-picture position information or the like about MPEG data, for example, is recorded in the clip information file.

The clip AV stream file stores data in which an MPEG-2TS (transport stream) is arranged according to a definition structure of a BDMV format.

Further, the clip information file stores management information for acquiring a reproduction start position or the like of data stored in the clip AV stream file, such as correspondence data including a reproduction time position, for example, a data position of byte sequence data in the clip AV stream file, or a reproduction start point (entry point: EP) in a case where data is developed on a temporal axis.

The playlist includes information obtained by indicating an access point corresponding to a clip reproduction start position or a reproduction end position is indicated by a time stamp as information on a temporal axis.

For example, with reference to the clip information file on the basis of a time stamp indicating a reproduction time elapse position from the content start point, an address can be acquired as a data read position in the clip AV Stream file, i.e., as a reproduction start point.

The clip information file is used to find information about an address where decoding of a stream in the clip AV stream file is to be started from the time stamp.

Thus, the playlist file includes designation information about a reproduction interval for data to be reproduced included in the clip (=clip information file+clip AV stream file) layer.

The playlist file includes one or more play items set therein, and includes designation information about a reproduction interval for data to be reproduced in which each play item is included in the clip (=clip information file+clip AV Stream file) layer.

As described above with reference to FIG. 5, the BDMV directory of the data unit 52 and subsequent directories store the following data:
an index file;
a playlist file;
a clip information file; and
a clip AV stream file.

For example, reproduction target data such as VR image data and non-VR image data other than VR images is stored in the clip AV stream file.

Database files such as an index file, a playlist file, and a clip information file are files each storing various data to be applied to reproduction processing for reproduction target data stored in the clip AV stream file, and are capable of recording attribute information and the like about data stored in the clip AV stream file.

An embodiment is described below in which image information that enables confirmation as to which one of the types of image data recorded in the information recording medium, i.e., which one of the image types of the VR image of type 1, the VR image of type 2, and non-VR images other than VR images, is recorded is recorded in the database file such as the index file, the playlist file, or the clip information file.

FIG. 7 is a diagram illustrating a specific example of VR identification information as image information stored in the index file, the playlist file, and the clip information file.

In the index file, information about data recorded on the entire information recording medium. The VR identification information to be recorded in the index file is the following information.

"VR type information indicating whether a VR image is included as data recorded on the information recording medium, and also indicating whether, in a case where the VR image is included, the recorded data is the VR image of type 1 or the VR image of type 2"

In the playlist file, information about data to be reproduced by applying the playlist can be recorded. The VR identification information to be recorded in the playlist file is the following information.

"VR type information indicating whether a VR image is included in target data to be reproduced by the playlist, and also indicating whether, in a case where the VR image is included, the reproduction target data is the VR image of type 1 or the VR image of type 2"

In the clip information file, information about data to be reproduced by applying the clip information file can be recorded. The VR identification information to be recorded in the clip information file is the following information.

"VR type information indicating whether a VR image is included in the reproduction target data associated with the clip information file, and also indicating whether, in a case where the VR image is included, the reproduction target data is the VR image of type 1 or the VR image of type 2"

Examples in which specific VR identification information is recorded in an index file, a playlist file, and a clip information file will be sequentially described below.

[3-2. Regarding an Example of Recording VR Identification Information about an Index File]

First, an example of recording VR identification information about an index file will be described with reference to FIG. 8 and subsequent figures.

As described above with reference to FIG. 7, information about data recorded on the entire information recording medium can be recorded in the index file, and the VR identification information to be recorded in the index file is the following information.

"VR type information indicating whether a VR image is included as data recorded on the information recording medium, and also indicating whether, in a case where the VR image is included, the recorded data is the VR image of type 1 or the VR image of type 2"

FIG. 8 is a diagram illustrating a data configuration example (syntax) of the index file.

In the index file, information about data recorded on the entire information recording medium, such as title information, is recorded, for example.

As illustrated in FIG. 8, an extension data recording area [ExtensionData( )] 101 in which various extension data can be recorded is set in the index file.

Note that, since various extension data are recorded in the extension data recording area [ExtensionData( )], an extension data identifier indicating the type of each of the pieces of extension data is associated with each extension data and recorded together with the extension data.

FIG. 9 illustrates an example of the extension data identifier.

The extension data identifier includes two IDs (ID1, ID2).

As the extension data identifier for the index file, some identifiers are already defined.

As the extension data identifier for the index file, some identifiers are already defined. For example,
ID1=0x0001
ID2=0x0002

These extension data identifiers are defined as a recording area for down convert information of LPCM (linear PCM).

A combination of the extension data identifiers, i.e.,

ID1=0x0004, and

ID2=0x0001 is undefined, and these extension data identifiers are set as identifiers each indicating an extension data recording area for recording VR identification information, i.e., the following VR identification information.

"VR type information indicating whether a VR image is included as data recorded on the information recording medium, and also indicating whether, in a case where the VR image is included, the recorded data is the VR image of type 1 or the VR image of type 2"

Note that setting of extension data identifiers illustrated in FIG. 9, i.e.,

ID1=0x0004, and

ID2=0x0001 is an example of setting of these IDs. A configuration using other IDs as IDs indicating a recording area for VR identification information can also be employed.

FIG. 10 is a diagram illustrating a configuration example (syntax) of a data recording area for VR identification information to be recorded in the extension data recording area [ExtensionData( )] 101 of the index file illustrated in FIG. 8.

As illustrated in FIG. 10, an extension data identifier (ID) recording area 102 and a data block (data_block) 103 are set in the extension data recording area 101 of the index file.

In the extension data identifier (ID) recording area 102, IDs (ID1=0x0004, ID2=0x0001) each indicating the recording area for the VR identification information described above are recorded.

After the extension data identifier (ID) recording area 102, the data block (data_block) 103 is set as the recording area for the VR identification information.

Specific data to be recorded in the data block (data_block) 103 will be described with reference to FIG. 11.

FIG. 11(a) is a diagram illustrating a detailed configuration of the data block (data_block) 103 illustrated in FIG. 10. In other words, a specific data example of VR identification information to be recorded in the index file is illustrated.

As illustrated in FIG. 11(a), the following data recording area is set in the data block.

(1) A VR image type information (VR_type) recording area 104.

(1) An example of data to be recorded in the VR image type information (VR_type) recording area 104 is illustrated in FIG. 11(b).

In the VR image type information (VR_type) recording area 104, a bit value indicating the type of image data recorded on the information recording medium (disk) recorded in the index file is recorded.

The VR image type information (VR_type) recording area 104 is, for example, 8-bit data.

As illustrated in FIG. 11(b), the type (non-VR image/VR image of type 1/VR image of type 2) of image data recorded on the information recording medium (disk) according to the bit value recorded in the VR image type information (VR_type) recording area 104 can be identified as follows.

VR image type information (VR_type) having a bit value=0: data recorded on the information recording medium does not include any VR image and includes only of non-VR images.

VR image type information (VR_type) having a bit value=1: data recorded on the information recording medium includes the VR image of type 1.

VR image type information (VR_type) having a bit value=2: data recorded on the information recording medium includes the VR image of type 2.

VR image type information (VR_type) having a bit value=3: data recorded on the information recording medium includes the VR image of type 1 and the VR image of type 2.

[3-3. Regarding an Example of Recording VR Identification Information in a Playlist File Playlist File]

Next, an example of recording VR identification information in a playlist file will be described with reference to FIG. 12 and subsequent figures.

As described above with reference to FIG. 7, in the playlist file, information about data to be reproduced by applying the playlist can be recorded, and the VR identification information to be recorded in the playlist file is the following information.

"VR type information indicating whether a VR image is included in target data to be reproduced by the playlist, and also indicating whether, in a case where the VR image is included, the reproduction target data is the VR image of type 1 or the VR image of type 2"

FIG. 12 is a diagram illustrating a data configuration example (syntax) of the playlist file.

In the playlist file, information about data to be reproduced by applying the playlist is recorded.

As illustrated in FIG. 12, in the playlist file, an extension data recording area [ExtensionData( )] 121 in which various extension data can be recorded is set.

Note that, like in the index file described above, various extension data are recorded in the extension data recording area [ExtensionData( )], an extension data identifier indicating the type of each of the pieces of extension data is associated with the corresponding extension data and recorded together with the extension data.

The extension data identifier includes two IDs (ID1, ID2).

In this embodiment, as extension data identifiers each indicating a VR identification information storing area in the playlist file, the following undefined identifiers are used.

ID1=0x0004

ID2=0x0002

In the extension data recording area associated with the identification information, VR identification information, i.e., the following VR identification information is recorded.

"VR type information indicating whether a VR image is included in target data to be reproduced by the playlist, and also indicating whether, in a case where the VR image is included, the reproduction target data is the VR image of type 1 or the VR image of type 2"

Note that setting of these extension data identifiers, i.e.,

ID1=0x0004, and

ID2=0x0002.

is an example of setting of these IDs. A configuration using other IDs as IDs indicating a recording area for VR identification information can also be employed.

FIG. 13 is a diagram illustrating a configuration example (syntax) of a data recording area for VR identification information to be recorded in the extension data recording area [ExtensionData( )] 121 of the playlist file illustrated in FIG. 12.

As illustrated in FIG. 13, an extension data identifier (ID) recording area 122 and a data block (data_block) 123 are set in an extension data recording area 121 of the playlist file.

In the extension data identifier (ID) recording area 122, IDs (ID1=0x0004, ID2=0x0002) each representing the recording area of the VR identification information described above is recorded.

After the extension data identifier (ID) recording area 122, the data block (data_block) 123 is set as the recording area for the VR identification information.

Specific data to be recorded in the data block (data_block) 123 will be described with reference to FIG. 14 and subsequent figures.

FIG. 14 is a diagram illustrating a detailed configuration example of the data block (data_block) 123 illustrated in FIG. 13. In other words, a specific data example of VR identification information to be recorded in the playlist file is illustrated.

FIG. 14(*a*) is a diagram illustrating a detailed configuration of the data block (data_block) 123 illustrated in FIG. 13. In other words, a specific data example of VR identification information to be recorded in the playlist file is illustrated.

As illustrated in FIG. 14(*a*), the following data recording area is set in the data block.

(1) A VR image type information (VR_type) recording area 124.

(1) FIG. 14(*b*) illustrates an example of data to be recorded in the VR image type information (VR_type) recording area 124.

In the VR image type information (VR_type) recording area 124, a bit value indicating the type of image data as data to be reproduced by applying the playlist file is recorded.

The VR image type information (VR_type) recording area 124 is, for example, 8-bit data.

As illustrated in FIG. 14(*b*), the type (non-VR image/VR image of type 1/VR image of type 2) of image data to be reproduced by applying the playlist file according to the bit value recorded in the VR image type information (VR_type) recording area 124 can be identified as follows.

VR image type information (VR_type) having a bit value=0: data to be reproduced by the playlist does not include any VR image and includes only of non-VR images.

VR image type information (VR_type) having a bit value=1: data to be reproduced by the playlist includes the VR image of type 1.

VR image type information (VR_type) having a bit value=2: data to be reproduced by the playlist includes the VR image of type 2.

VR image type information (VR_type) having a bit value=3: data to be reproduced by the playlist includes the VR image of type 1 and the VR image of type 2.

While an example in which two VR image types are used is described above with reference to FIG. 14, a setting example of VR image type information, for example, in a case where three VR image types are used is described with reference to FIG. 15.

FIG. 15 illustrates another detailed configuration example of the data block (data_block) 123 illustrated in FIG. 13.

Like FIG. 14(*a*), FIG. 15(*a*) is a diagram illustrating a detailed configuration of the data block (data_block) 123 illustrated in FIG. 13. In other words, a specific data example of VR identification information to be recorded in the playlist file is illustrated.

As illustrated in FIG. 15(*a*), the following data recording area is set in the data block.

(1) A VR image type information (VR_type) recording area 125.

(1) FIG. 15(*b*) illustrates an example of data to be recorded in the VR image type information (VR_type) recording area 125.

In the VR image type information (VR_type) recording area 125, a bit value indicating the type of image data as data to be reproduced by applying the playlist file is recorded.

The VR image type information (VR_type) recording area 125 is, for example, 8-bit data.

As illustrated in FIG. 15(*b*), the type of image data as data to be reproduced by applying the playlist file according to the bit value recorded in the VR image type information (VR_type) recording area 125 can be identified as follows.

VR image type information (VR_type) having a bit value=0: data to be reproduced by the playlist does not include any VR image and includes only of non-VR images.

VR image type information (VR_type) having a bit value=1: data to be reproduced by the playlist includes the VR image of type 1.

VR image type information (VR_type) having a bit value=2: data to be reproduced by the playlist includes the VR image of type 2.

VR image type information (VR_type) having a bit value=3: data to be reproduced by the playlist includes the VR image of type 3.

Thus, in a case where three VR image types are used, a bit value illustrated in FIG. 15 can be set.

Note that, in addition, bit values indicating the following information may be set as other bit values.

Data to be reproduced by the playlist includes VR images of types 1 and 2.

Data to be reproduced by the playlist includes VR images of types 1 and 3.

Data to be reproduced by the playlist includes VR images of types 2 and 3.

Data to be reproduced by the playlist includes VR images of types 1, 2, and 3.

Also, in a case where four or more VR image types are used, similarly, a configuration for setting a bit value capable of identifying all combinations of image types can be employed.

These pieces of information are recorded in the playlist file. In a case where an image is reproduced using a playlist, appropriate processing can be performed depending on image characteristics according to reference information with reference to these pieces of information.

[3-4. Regarding an Example of Recording VR Identification Information of a Play Item Unit in the Playlist File]

Next, an example of recording VR identification information of a play item unit in the playlist file will be described with reference to FIG. 16 and subsequent figures.

As described above with reference to FIGS. 5 and 6, the playlist file is a file storing reproduction control information indicating a content reproduction order or the like, and includes, for example, various reproduction control information such as designation information about a clip information file recording reproduction position information or the like.

Further, one or more play items (PlayItem) are set in the playlist file, and each of the play items includes reproduction interval designation information for data to be reproduced included in the clip (=clip information file+clip AV Stream file) layer.

An example of recording VR identification information of the play item unit in the playlist file will be described below.

FIG. 16 illustrates a syntax representing a data configuration of the playlist file.

As illustrated in FIG. 16, in the playlist file, type information [type_indicator] indicating a file type is recorded, and after that, start address information [PlayList_start_address] to [ExtensionData_start_address] for each entity data is recorded, and after that, a recording area for entity data to be recorded in the playlist file is provided.

The following areas are set in the recording area for the entity data.

(1) A reproduction control parameter storing area [AppInfoPlayList( )] storing a reproduction control parameter or the like (2) A reproduction stream information recording area 126 [PlayList( )] recording stream information or the like about reproduction target data in the play item unit included in the playlist (3) A mark information recording area [PlayListMark( )] recording reproduction start position information or the like indicating an entry mark or the like used for, for example, chapter search or the like (4) An extension data recording area [ExtensionData( )] in which various extension data can be recorded An example in which VR image information is recorded in the reproduction stream information recording area [PlayList( )] 126 in which stream information or the like about reproduction target data in the play item unit is recorded will now be described.

FIG. 17 is a diagram illustrating a data configuration (syntax) of the reproduction stream information recording area [PlayList( )] 126.

As illustrated in FIG. 17, a play item unit information recording area [PlayItem( )] 127 is set in the reproduction stream information recording area [PlayList( )] 126 of the playlist file.

FIG. 18 is a diagram illustrating a data configuration (syntax) of the play item unit information recording area [PlayItem( )] 127.

As illustrated in FIG. 18, a Stream number table (STN table) 128 is recorded in the play item unit information recording area [PlayItem( )] 127 of the reproduction stream information recording area [PlayList( )] 126 of the playlist file.

In the STN table (stream number table) 128, stream information such as an image, audio, or caption to be reproduced by the play item included in the playlist is recorded.

Note that the play item unit included in the playlist file is recorded in the STN table (stream number table).

FIG. 19 illustrates a data configuration (syntax) of the STN table (Stream number table) 128.

As illustrated in FIG. 19, the following stream information is recorded in the STN table (Stream number table) 128.

(a) Stream entry information (stream_entry) 129

(b) Stream attribute information (stream_attribute) 130

(a) In the stream entry information (stream_entry) 129, for example, packet information, such as a packet ID (PID) corresponding to a packet identifier of a TS packet storing data, or the like is recorded.

(b) In the stream attribute information (stream_attribute) 130, for example, a stream number, a language type, the number of channels, codec information, and the like are recorded.

Note that the packet ID included in the stream entry information (stream_entry) 129 is set to an ID that varies depending on the type of data stored in the packet.

Specifically, an ID that varies depending on the data type, such as image, audio, or caption data, is set.

Further, for example, different PIDs for images of different types are set for image data. Also for audio data or caption data, for example, different PIDs are set depending on different language types (Japanese, English, etc.).

In this example, VR identification information is recorded in the stream attribute information (stream_attribute) 130.

In the stream attribute information (stream_attribute) 130, stream information such as an image, audio, or caption to be reproduced by the play item included in the playlist can be stored.

Specifically, the VR type of an image stream can be individually recorded for the image stream selected as a reproduction target by one play item in the playlist file.

FIG. 20 illustrates an example of recording VR type information in this example.

FIG. 20(*a*) is a diagram illustrating a detailed configuration of the stream attribute information (stream_attribute) 130 of the STN table illustrated in FIG. 19.

As illustrated in FIG. 20(*a*), the following data recording area is set in the stream attribute information (stream_attribute) in the STN table.

(1) A VR image type information (VR_type) recording area 131.

(1) FIG. 20(*b*) illustrates an example of data to be recorded in the VR image type information (VR_type) recording area 131.

In the VR image type information (VR_type) recording area 131, a bit value indicating the type of image data as data to be reproduced by applying one play item set in the playlist file is recorded.

The VR image type information (VR_type) recording area 131 is, for example, 8-bit data.

As illustrated in FIG. 20(*b*), the type of image data as data to be reproduced by applying the play item according to the bit value recorded in the VR image type information (VR_type) recording area 131 can be identified as follows.

VR image type information (VR_type) having a bit value=0: data to be reproduced by the play item does not include any VR image and includes only of non-VR images.

VR image type information (VR_type) having a bit value=1: data to be reproduced by the play item includes the VR image of type 1.

VR image type information (VR_type) having a bit value=2: data to be reproduced by the play item includes the VR image of type 2.

VR image type information (VR_type) having a bit value=3: data recorded by the play item includes the VR image of type 3.

Note that, in addition, bit values indicating the following information may be set as other bit values.

Data to be reproduced by the play item includes VR images of types 1 and 2.

Data to be reproduced by the play item includes VR images of types 1 and 3.

Data to be reproduced by the play item includes VR images of types 2 and 3.

Data to be reproduced by the play item includes VR images of types 1, 2, and 3.

Also, in a case where four or more VR image types are used, similarly, a configuration for setting a bit value capable of identifying all combinations of image types can be employed.

In the playlist file, VR information in the play item unit can also be recorded.

In the case of reproducing an image by using a specific play item in the playlist, appropriate processing can be performed depending on image characteristics according to reference information with reference to these pieces of information.

[3-5. Regarding an Example of Recording VR Identification Information in a Clip Information File]

Next, an example of recording VR identification information corresponding to a clip information file will be described with reference to FIG. 21 and subsequent figures.

As described above with reference to FIG. 7, information about reproduction target data associated with the clip information file can be recorded in the clip information file, and VR identification information to be recorded in the clip information file is the following information.

"VR type information indicating whether a VR image is included in the reproduction target data associated with the clip information file, and also indicating whether, in a case where the VR image is included, the reproduction target data is the VR image of type 1 or the VR image of type 2"

FIG. 21 is a diagram illustrating a data configuration example (syntax) of the clip information file.

In the clip information file, information about reproduction data associated with the clip information is recorded.

As illustrated in FIG. 21, an extension data recording area [ExtensionData( )] 141 in which various extension data can be recorded is set in the clip information file.

Note that, like in the index file or playlist file described above, various extension data are recorded in the extension data recording area [ExtensionData( )]. Accordingly, an extension data identifier indicating the type of extension data is associated with each extension data and recorded together with the extension data.

The extension data identifier includes two IDs (ID1, ID2).

In this embodiment, extension data identifiers each indicating a VR identification information storing area in the clip information file are the following undefined identifiers:

ID1=0x0004

ID2=0x0003

These expansion data identifiers are used.

In the extension data recording area associated with the identification information, VR identification information, i.e., the following VR identification information is recorded.

"VR type information indicating whether a VR image is included in reproduction target data associated with the clip information file, and also indicating whether, in a case where the VR image is included, the reproduction target data is the VR image of type 1 or the VR image of type 2"

Note that setting of these extension data identifiers, i.e.,

ID1=0x0004, and

ID2=0x0003.

is an example of setting of these IDs. A configuration using other IDs as IDs indicating a recording area for VR identification information can also be employed.

FIG. 22 is a diagram illustrating a configuration example (syntax) of a data recording area for VR identification information to be recorded in the extension data recording area [ExtensionData( )] 141 of the clip information file illustrated in FIG. 21.

As illustrated in FIG. 22, an extension data identifier (ID) recording area 142 and a data block (data_block) 143 are set in the extension data recording area 141 of the clip information file.

In the extension data identifier (ID) recording area 142, IDs (ID1=0x0004, ID2=0x0003) each indicating the recording area for the VR identification information described above are recorded.

After the extension data identifier (ID) recording area 142, the data block (data_block) 143 is set as the recording area for the VR identification information.

Specific data to be recorded in the data block (data_block) 143 will be described with reference to FIG. 23.

FIG. 23 is a diagram illustrating a detailed configuration of the data block (data_block) 143 illustrated in FIG. 22. In other words, a specific data example of the VR identification information to be recorded in the clip information file.

As illustrated in FIG. 23(a), the following data recording area is set in the data block.

(1) A VR image type information (VR_type) recording area 144.

(1) FIG. 23(b) illustrates an example of data to be recorded in the VR image type information (VR_type) recording area 144.

In the VR image type information (VR_type) recording area 144, a bit value indicating the type of reproduction target image data associated with the clip information file is recorded.

The VR image type information (VR_type) recording area 144 is, for example, 8-bit data.

As illustrated in FIG. 23(b), the type of reproduction target image data associated with the clip information file according to the bit value recorded in the VR image type information (VR_type) recording area 144 can be identified as follows.

VR image type information (VR_type) having a bit value=0: image data associated with the clip information file does not include any VR image and includes only of non-VR images.

VR image type information (VR_type) having a bit value=1: image data associated with the clip information file includes the VR image of type 1.

VR image type information (VR_type) having a bit value=2: image data associated with the clip information file includes the VR image of type 2.

VR image type information (VR_type) having a bit value=3: image data associated with the clip information file includes the VR image of type 3.

Note that, in addition, bit values indicating the following information may be set as other bit values.

VR images of types 1 and 2 are included in image data associated with the clip information file.

VR images of types 1 and 3 are included in image data associated with the clip information file.

VR images of types 2 and 3 are included in image data associated with the clip information file.

VR images of types 1, 2, and 3 are included in image data associated with the clip information file.

Also, in a case where four or more VR image types are used, similarly, a configuration for setting a bit value capable of identifying all combinations of image types can be employed.

The VR identification information is recorded in the clip information file. In the case of reproducing an image by using clip information, appropriate reproduction processing can be performed depending on image characteristics and the like obtained from reference information with reference to the clip information.

[3-6. Regarding an Example in which VR Identification Information is Recorded in a Stream Coding Information Recording Field of the Clip Information File]

Next, an example in which VR identification information is recorded in the stream coding information recording field of the clip information file will be described.

FIG. 24 is a diagram illustrating a data configuration (syntax) of a clip information file.

As illustrated in FIG. 24, the following entity data recording fields are set in the clip information file.

(1) A clip information recording field [ClipInfo( )]145 for recording in which clip attribute information such as a clip stream type information or application type information, (2) A sequence information recording field [SequenceInfo( )] 146 for recording sequence information such as time management information mainly in reproduction processing, (3) A program information recording field [ProgramInfo( )] 147 for recording program information such as identification information about a program map table, or the number of streams in a program stream, and (4) An extension data recording field [ExtensionData( )] 148 in which various extension data can be recorded.

An example in which VR identification information is recorded in the program information recording field [ProgramInfo( )] 147 for recording program information included in the clip information file will be described below.

FIG. 25 illustrates a syntax diagram as a data configuration of the program information recording field [ProgramInfo( )] 147 included in the clip information file.

The program information recording field [ProgramInfo( )] illustrated in FIG. 25 is a program information recording field [ProgramInfo( )] preliminarily set in the clip information file.

VR identification information is recorded in a stream coding information recording field [StreamCodingInfo( )] 149 of this field.

The stream coding information recording field [StreamCodingInfo( )] 149 is a field for recording image attribute information in a stream coding mode [Stream_coding_type] unit set in the program information recording field [ProgramInfo( )] within the clip information file.

A specific data configuration of the stream coding information recording field [StreamCodingInfo( )] 149 will be described with reference to FIG. 26.

FIG. 26(*a*) is a diagram illustrating a detailed configuration of the stream coding information recording field [StreamCodingInfo( )] 149 illustrated in FIG. 25. In other words, a specific data recording example of the VR identification information to be recorded in the clip information file is illustrated.

As illustrated in FIG. 26(*a*), in the stream coding information recording field [StreamCodingInfo( )] 149, the following data recording area is set.

(1) A VR image type information (VR_type) recording area 150.

(1) FIG. 26(*b*) illustrates an example of data to be recorded in the VR image type information (VR_type) recording area 150.

In the VR image type information (VR_type) recording area 150, a bit value indicating the type of reproduction target image data associated with the clip information file is recorded.

The VR image type information (VR_type) recording area 150 is, for example, 8-bit data.

As illustrated in FIG. 26(*b*), the type of reproduction target image data associated with the clip information file according to the bit value recorded in the VR image type information (VR_type) recording area 150 can be identified as follows.

VR image type information (VR_type) having a bit value=0: image data associated with the clip information file does not include any VR image and includes only of non-VR images.

VR image type information (VR_type) having a bit value=1: image data associated with the clip information file includes the VR image of type 1.

VR image type information (VR_type) having a bit value=2: image data associated with the clip information file includes the VR image of type 2.

VR image type information (VR_type) having a bit value=3: image data associated with the clip information file includes the VR image of type 3.

Note that, in addition, bit values indicating the following information may be set as other bit values.

VR images of types 1 and 2 are included in image data associated with the clip information file.

VR images of types 1 and 3 are included in image data associated with the clip information file.

VR images of types 2 and 3 are included in image data associated with the clip information file.

VR images of types 1, 2, and 3 are included in image data associated with the clip information file.

Also, in a case where four or more VR image types are used, similarly, a configuration for setting a bit value capable of identifying all combinations of image types can be employed.

The VR identification information is recorded in the clip information file. In the case of reproducing an image by using clip information, appropriate reproduction processing can be performed depending on image characteristics and the like obtained from reference information with reference to the clip information.

[4. Regarding an example of a configuration for Inputting and Outputting Information Between the Reproduction Device and the Display Device]

As described above with reference to FIG. 4 and the like, processing that is required for the reproduction device (BD player) 20 to reproduce image data recorded on the information recording medium 10 such as a BD (Blu-ray (Registered Mark) Disc), for example, and required for the display devices 30*a* to 30*d* to perform normal image display is, for example, the following processing.

(1) The reproduction device 20 confirms which one of the types of image data recorded on the mounted information recording medium (BD) 10, i.e., which one of the VR image of type 1, the VR image of type 2, and non-VR images of other than VR images, is recorded.

(2) The reproduction device 20 confirms which one of the types of image data that can be displayed on the display device connected to the reproduction device, i.e., which one of the VR image of type 1, the VR image of type 2, and non-VR images of other than VR images, can be displayed.

(3) The display devices 30*a* to 30*d* confirm which one of the types of image data of the VR image of type 1, the VR image of type 2, and non-VR images of other than VR images corresponds to data input from the reproduction device 20.

The above-described confirmation processings (1) to (3) are executed before the image data is output from the reproduction device 20 to the display devices 30*a* to 30*d*, thereby enabling normal reproduction and display processing depending on each image type.

The above-described processing (1) is implemented in such a manner that the reproduction device refers to VR identification information recorded on the information recording medium described above, i.e., VR identification information recorded on the database file such as the index file, the playlist file, the clip information file.

On the other hand, in order to perform the above-described confirmation processing (2) and (3), it is necessary to input and output information between the reproduction device and the display device.

This processing will be described below.

Figure 27:
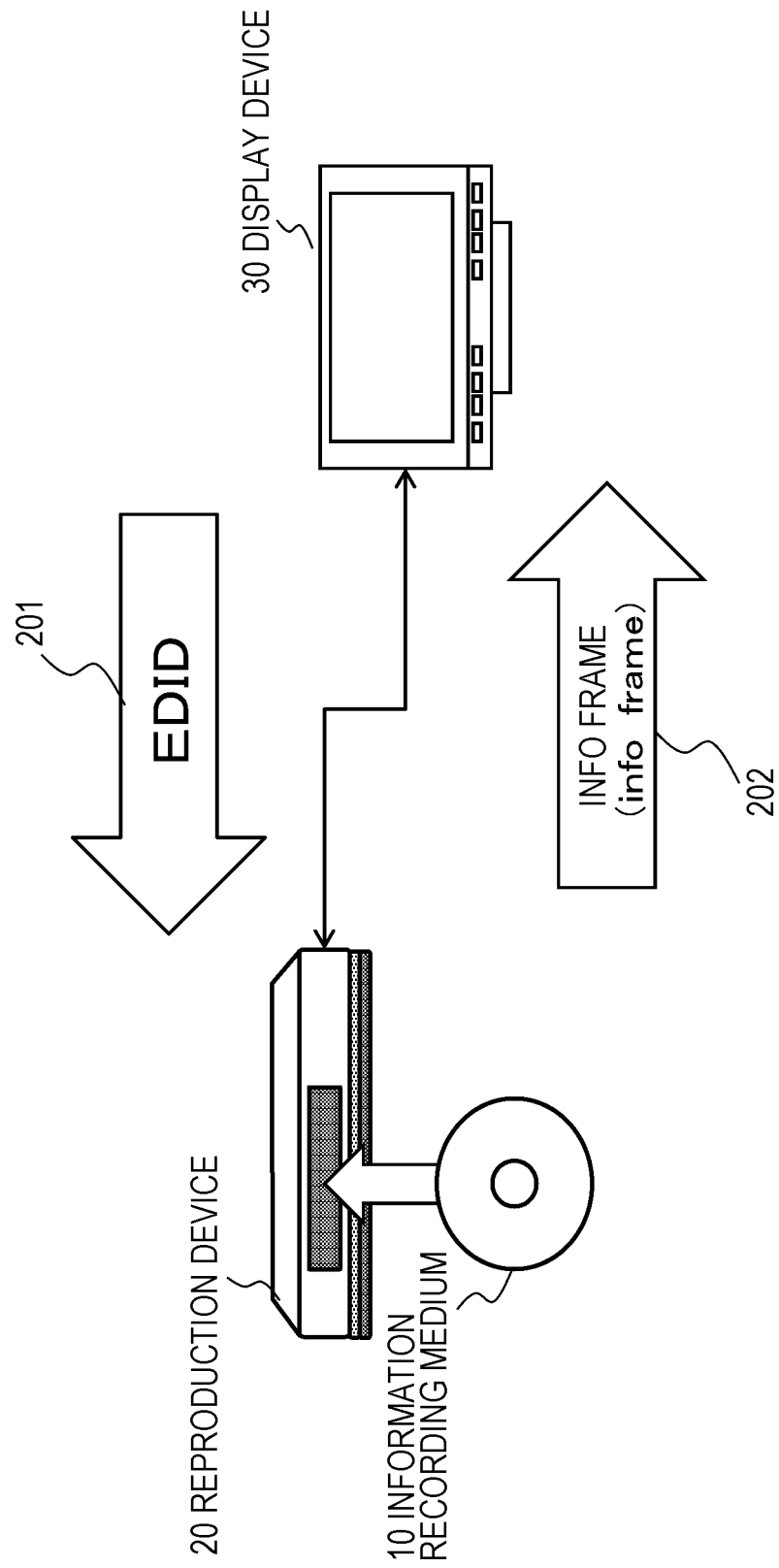
FIG. 27 is a diagram illustrating data to be transferred between the reproduction device and the display device.

FIG. 27 illustrates the reproduction device 20 having the information recording medium 10, such as a BD, mounted thereon, and the display device 30, such as a television, which displays data to be reproduced by the reproduction device 20.

The reproduction device 20 and the display device 30 are connected with, for example, an HDMI (Registered Mark) cable or the like, and thus various data can be transmitted and received between the reproduction device 20 and the display device 30.

Note that the connection configuration between the reproduction device 20 and the display device 30 is not limited to the HDMI (Registered Mark) cable and other various connection figurations can be used. For example, a configuration for performing communication via a wireless network may be used.

When a communication connection between the reproduction device 20 and the display device 30 is established, the display device 30 outputs function information or the like about the display device to the reproduction device 20.

Specifically, as illustrated in FIG. 27, for example, an EDID (Extended Display Identification Data) 201 defined in HDMI (Registered Mark) is output.

The EDID includes display device function information indicating, for example, which type of images can be output from the display device 30.

The reproduction device 20 stores the display device function information received from the display device 30 in the storage unit. Specifically, the display device function information is stored in, for example, a PSR (Player Status Resister).

On the other hand, during processing for reproducing the content stored in the information recording medium 10, the reproduction device 20 stores reproduction data information about reproduction processing data in the info frame illustrated in FIG. 27 and notifies the display device 30 of the reproduction data information.

Specific configuration examples of the EDID 201, which is display device information to be transmitted to the reproduction device 20 by the display device 30, and an info frame 202 storing reproduction data information to be transmitted to the display device 30 by the reproduction device 20 will be sequentially described below.

[4-1. Regarding Display Device Information to be Transmitted to the Reproduction Device by the Display Device]

Display device information to be transmitted to the reproduction device 20 by the display device 30 will now be described with reference to FIG. 28 and subsequent figures.

FIG. 28 is a diagram illustrating a data configuration example of the EDID (Extended Display Identification Data) as display device function information to be transmitted to the reproduction device 20 by the display device 30.

The EDID is a 256-byte data block defined by standards CEA861 defined by the CEA (Consumer Electronics Association) which is a standardization organization.

The display device 30 stores VR image reproduction function information (VR type Data block) 221 indicating which one of the types of image data (non-VR image/VR image of type 1/VR image of type 2) can be reproduced by the display device 30 in the EDID and transmits the VR type data block 221 to the reproduction device 20.

For example, as illustrated in FIG. 28, the VR image reproduction function information (VR type Data block) 221 is stored in the item of EDID tag code [0x8] in the EDID and transmitted to the reproduction device 20.

FIG. 29 illustrates a specific example of the VR image reproduction function information (VR type Data block) 221.

The VR image reproduction function information (VR type Data block) 221 includes, for example, 8-bit data illustrated in FIG. 29.

As illustrated in FIG. 29(a), in the case of setting all bits=0 in the 8-bit data (bit 0 to bit 7) constituting the VR image reproduction function information, the display device 30 is a non-VR-image-compliant display device which does not have a VR image reproduction function.

Further, as illustrated in FIG. 29(b), in the case of setting the bit 0=1 in the 8-bit data (bit 0 to bit 7) constituting the VR image reproduction function information, the display device 30 has a function for reproducing the VR image of type 1.

Further, as illustrated in FIG. 29(c), in the case of setting the bit 1=1 in the 8-bit data (bit 0 to bit 7) constituting the VR image reproduction function information, the display device 30 has a function for reproducing the VR image of type 2.

Further, as illustrated in FIG. 29(d), in the case of setting the bit 0=1 and the bit 1=1 in the 8-bit data (bit 0 to bit 7) constituting the VR image reproduction function information, the display device 30 has a function for reproducing both the VR image of type 1 and VR image of type 2.

Upon receiving the EDID including the VR image reproduction function information from the display device 30, the reproduction device 20 stores the data included in the received EDID in the storage unit (PSR: player status register).

Figure 30:
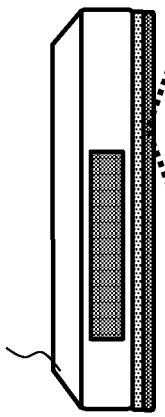
FIG. 30 is a diagram illustrating an example in which display device function information (EDID) is recorded on a storage unit (PSR) in the reproduction device.

FIG. 30 illustrates an example of the display device function information stored in the storage unit (PSR 33) of the reproduction device 20.

The reproduction device 20 stores the display device function information in the PSR 33 including a partial area of the storage unit, for example, a 32-bit data recording area.

Bit values corresponding to the display function of the display device is stored in are stored in lower two bits (bit 1, bit 0) of the 32-bit data recording area.

For example, as illustrated in FIG. 30, the correspondence relationship between the setting of bit values and the function of the display device is as follows.

(a) (bit 1, bit 0)=(0,0): the display device does not have a VR image display function.

(b) (bit 1, bit 0)=(0,1): the display device has a function for displaying only the VR image of type 1.

(c) (bit 1, bit 0)=(1,0): the display device does not have a function for displaying only the VR image of type 2.

(d) (bit 1, bit 0)=(1,1): the display device has a function for displaying the VR image of type 1 and the VR image of type 2.

The reproduction device 20 stores the display function information about the display device in the storage unit (PSR 33) as illustrated in FIG. 30 on the basis of the EDID received from the display device 30.

The reproduction device 20 can discriminate the display function of the display device 30 connected to the reproduction device 20, i.e., whether the image to be displayed is the VR image of type 1, the VR image of type 2, or only the non-VR image other than VR images, by referring to the information stored in the storage unit.

Note that an example in which the EDID is used as display device information to be transmitted to the reproduction device 20 by the display device 30 is described herein. However, a configuration in which display device information is transmitted by transmitting and receiving data having other formats may be used. For example, a configuration for storing display device information in a wireless communication packet and transmitting the packet can be used.

Further, the reproduction device 20 also stores the image conversion function information included in the reproduction device itself in a storage unit (PSR 32) of the reproduction device 20.

The image conversion function of the reproduction device 20 will be described with reference to FIG. 31.

Figure 31:
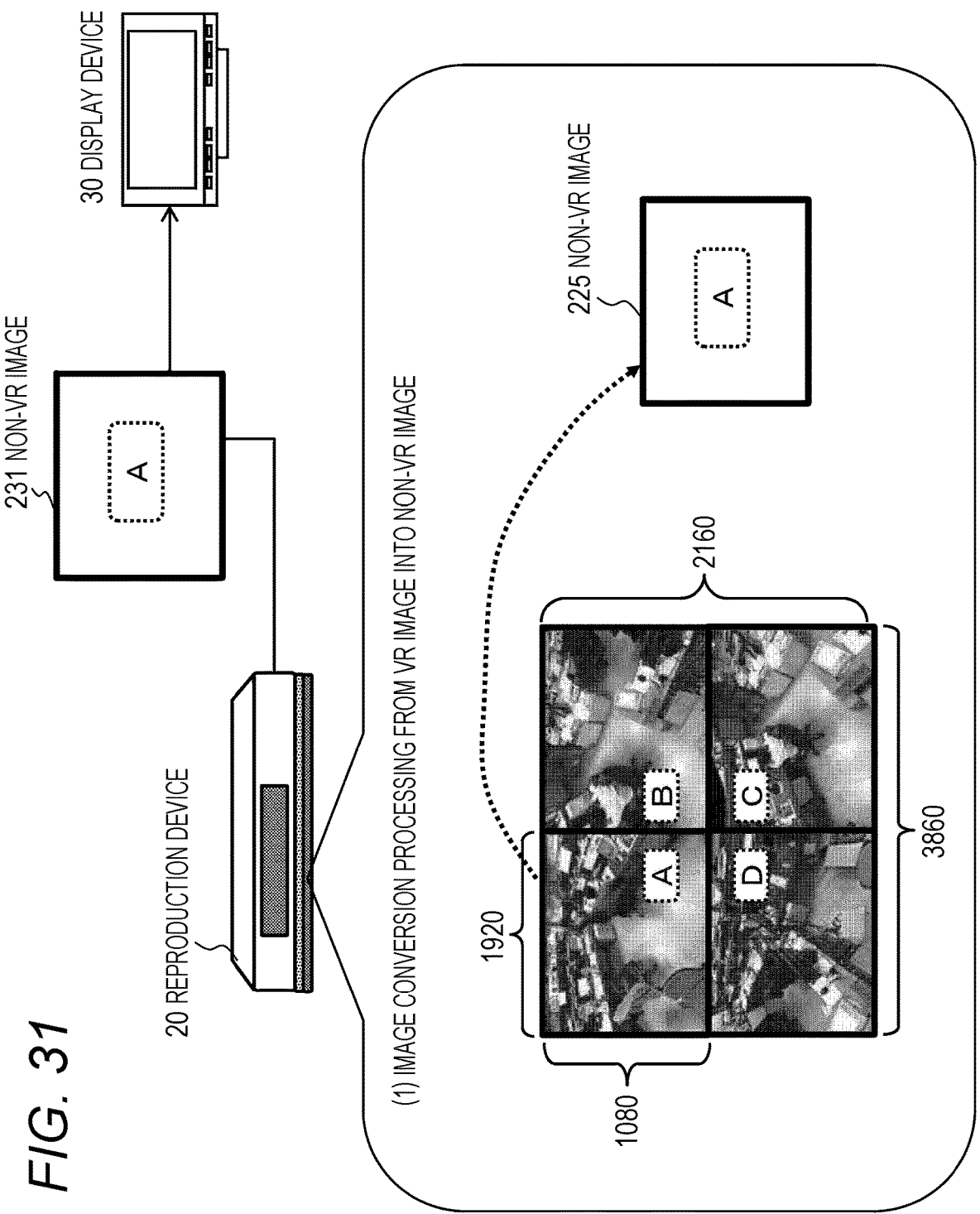
FIG. 31 is a diagram illustrating an image conversion function of the reproduction device.

FIG. 31 illustrates an example of a case where the image data stored in the information recording medium mounted on the reproduction device 20 is the VR image of type 1.

The reproduction device 20 confirms that the image data to be reproduced is the VR image of type 1 on the basis of the VR identification information recorded on the information recording medium.

Further, the reproduction device 20 confirms that the display device 30 does not have a VR image display function on the basis of the display device function information (EDID) received from the display device 30 connected to the reproduction device 20.

In this case, even when the reproduction device 20 outputs the VR image of type 1 to the display device 30, the display device 30 cannot display the VR image of type 1.

In this situation, the reproduction device 20 converts the VR image of type 1 read from the information recording medium into the non-VR image.

As illustrated in FIG. 31(1), processing for converting a VR image into a non-VR image is executed.

A non-VR image 225 generated by the image conversion processing is output to the reproduction device 30.

As a result of the processing, the display device 30 can display a non-VR image 231.

However, only the reproduction device having an image conversion function for converting a VR image into a non-VR image can execute such processing.

This image conversion function varies depending on the reproduction device. For example, it is assumed that a reproduction device capable of converting only the VR image of type 1 into the non-VR image, a reproduction device capable of converting only the VR image of type 2 into the non-VR image, and the like exist.

The reproduction device 20 stores information about the image conversion function included in the reproduction device 20 in the storage unit (PSR). The reproduction device 20 confirms whether it is possible to perform image conversion depending on the display function of the connected display device by referring to the information stored in the storage unit, as needed. In a case where it is confirmed that it is possible to perform image conversion, the image conversion is executed and the converted image is output to the display device 30.

FIG. 32 illustrates an example of the image conversion function information about the reproduction device stored in the storage unit (PSR 32) of the reproduction device 20.

The reproduction device 20 stores the image conversion function information about the reproduction device in the PSR 32 including a partial area of the storage unit, for example, a 32-bit data recording area.

Bit values corresponding to the image conversion function of the reproduction device are stored in lower 2-bit (bit 1, bit 0) of the 32-bit data recording area.

For example, as illustrated in FIG. 32, the correspondence relationship between the setting of bit values and the image conversion function of the reproduction device is as follows.

(a) (bit 1, bit 0)=(0,0): the reproduction device does not have a VR image conversion function.

(b) (bit 1, bit 0)=(0,1): the reproduction device has a conversion function for converting only the VR image of type 1 into the non-VR image.

(c) (bit 1, bit 0)=(1,0): the reproduction device has a conversion function for converting only the VR image of type 2 into the non-VR image.

(d) (bit 1, bit 0)=(1,1): the reproduction device has a conversion function for converting the VR image of type 1 and the VR image of type 2 into the non-VR image.

The reproduction device 20 can confirm the image conversion function included in the reproduction device 20 on the basis of the information stored in the storage unit.

In a case where the display device 30 connected to the reproduction device 20 is a display device capable of displaying only the non-VR image other than VR images, the reproduction device compares the type of the VR image to be reproduced with the reproduction device image conversion function stored in the storage unit (PSR 32). In a case where it is confirmed that the image conversion can be performed, the image conversion function can be executed to convert the VR image into the non-VR image to be output to the display device 30.

[4-2. Regarding Reproduction Data Information to be Transmitted to the Display Device by the Reproduction Device]

Next, a specific configuration example of the info frame 202 as reproduction data information to be transmitted to the display device 30 by the reproduction device 20 illustrated in FIG. 27 will be described.

FIG. 33 is a diagram illustrating a specific data configuration example of the info frame 202 to be transmitted to the display device 30 by the reproduction device 20.

As illustrated in FIG. 33(a), the info frame 202 includes a plurality of fields, and various pieces of information recorded in each field unit are provided from the reproduction device 20 to the display device 30.

This information is reproduction data information to be applied, by the display device 30, to, for example, display processing for a reproduction content input from the reproduction device 20 or the like.

In a data byte 1 (DATA BYTE1) field 231, the VR image type information (VR_type) 231 of reproduction image data is recorded.

As illustrated in FIG. 33(b), the type of reproduction image data according to the bit values recorded in the VR image type information (VR_type) 231 can be identified as follows.

VR image type information (VR_type) having a bit value=0: the reproduction data does not include any VR image and includes only of non-VR images.

VR image type information (VR_type) having a bit value=1: the reproduction data includes the VR image of type 1.

VR image type information (VR_type) having a bit value=2: the reproduction data includes the VR image of type 2.

VR image type information (VR_type) having a bit value=3: the reproduction data includes the VR image of type 3.

Note that, in addition, bit values indicating the following information may be set as other bit values.

Reproduction data includes VR images of types 1 and 2.
Reproduction data includes VR images of types 1 and 3.
Reproduction data includes VR images of types 2 and 3.
Reproduction data includes VR images of types 1, 2, and 3.

Also, in a case where four or more VR image types are used, similarly, a configuration for setting a bit value capable of identifying all combinations of image types can be employed.

The display device 30 can perform appropriate processing according to the content type (non-VR image/VR image of type 1/VR image of type 2) on the content input from the reproduction device 20 by referring to the data stored in the info frame 202, thereby making it possible to execute appropriate image display.

5. Regarding the Configuration and Processing of the Image Processing Device that Executes Data Recording Processing on the Information Recording Medium Next, the configuration and processing of the image processing device that executes data recording processing on the information recording medium will be described with reference to FIGS. 34 and 35.

As described above with reference to FIG. 4, in order to implement a normal display of images on the display device 30 illustrated in FIG. 4, it is necessary for the reproduction device 20 to confirm the type of image data recorded on the mounted information recording medium (BD) 10, i.e., which one of the image types of the VR image of type 1, the VR image of type 2, and the non-VR image other than VR images, is recorded.

To enable the confirmation processing, as described above, VR identification information or the like is recorded in the data file storing management information, such as image data, attribute information, or reproduction control information.

In a case where a BD (Blu-ray (Registered Mark) Disc) is used as the information recording medium, VR identification information or the like is recorded in the database file, such as the index file, the playlist file, and the clip information file, which are defined in a BD format.

The configuration and processing sequence of the image processing device that executes information generation processing on the information recording medium recording the VR identification information, specifically, data recording processing on the information recording medium, such as a BD, will be described below.

Figure 34:
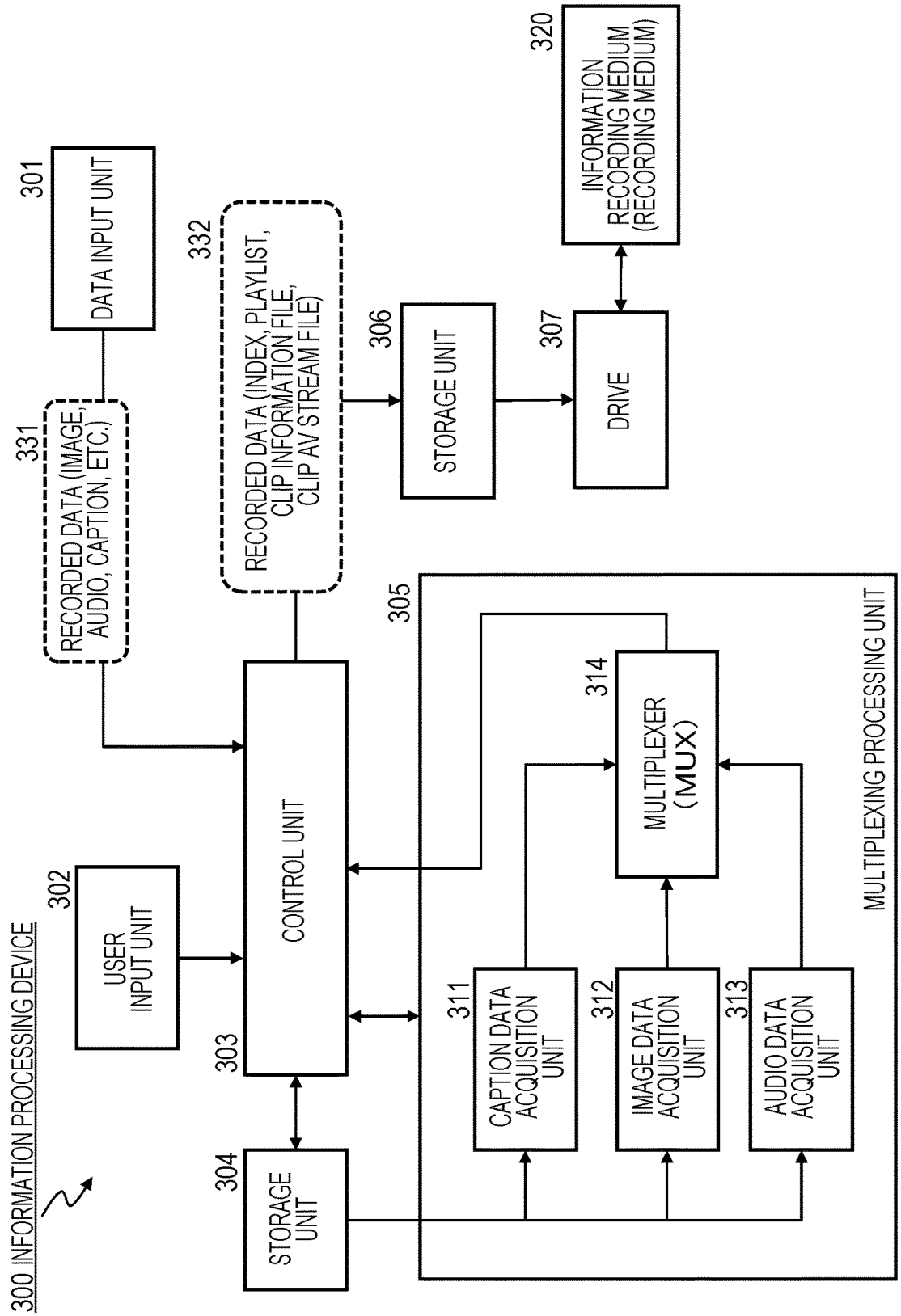
FIG. 34 is a diagram illustrating a configuration of an image processing device that executes data recording on the information recording medium.

FIG. 34 is a diagram illustrating a configuration of an image processing device 300 that executes data recording processing on an information recording medium such as a BD.

The image processing device 300 records a stream file (clip AV stream file) storing an image file of a VR image of type 1, or a VR image of a type 2, a non-VR image other than the VR image, or the like on an information recording medium (recording medium) 320 illustrated in FIG. 34, also records a database file, such as an index file, a play lit file, or a clip information file, storing the above-described VR identification information and the like, and generates a data recording disk according to a BD format.

A data input unit 301 inputs data for record 331, specifically, image data, audio data, caption data, and the like, to the information recording medium 320. These data for record 331 are created by a content creator, recorded into, for example, one medium or a plurality of individual media, and input to the image processing device 300 via the media. Alternatively, a configuration for inputting the data via a network or the like may be used.

The data for record 331 is stored in the storage unit 304 under control of the control unit 303, and is then input to a multiplexing processing unit 305.

The multiplexing processing unit 305 includes a caption data acquisition unit 311, an image data acquisition unit 312, an audio data acquisition unit 313, and a multiplexer (MUX) 314.

The caption data acquisition unit 311 acquires caption data from the data for record 331 that is input by the data input unit 301 and stored in the storage unit 304.

The image data acquisition unit 312 acquires image data from the data for record 331 which is input by the data input unit 301 and stored in the storage unit 304.

The audio data acquisition unit 313 acquires audio data from the data for record 331 which is input by the data input unit 301 and stored in the storage unit 304.

The multiplexer (MUX) 314 receives data, such as caption, image, and audio data, which are acquired from the caption data acquisition unit 311, the image data acquisition unit 312, and the audio data acquisition unit 313, and generates a transport stream file (TS file) storing these pieces of data. Specifically, for example, the clip AV stream file described above with reference to FIG. 5 and the like is generated.

This clip AV stream file is output and recorded by the recording unit 306 onto the information recording medium 320 via a drive 307 under control of the control unit 303.

The clip AV stream file is configuration data of recorded data 332 illustrated in FIG. 34.

A user input unit 302 inputs a data recording start request or the like for, for example, the information recording medium 320.

Further, information indicating, for example, the type of recorded data, specifically, the non-VR image other than VR images, the VR image of type 1, the VR image of type 2, or the like is included or not is input.

A control unit 401 generates management data and a reproduction control information file to be recorded on an information recording medium 520 on the basis of these pieces of input information. Specifically, the recorded data 332 including a database file such as an index file, a playlist file, and a clip information file, in which the VR identification information described above is recorded is generated.

The recorded data 332 including a database file such as an index file, a playlist file, and a clip information file, in which the VR identification information is recorded is output and recorded by the recording unit 306 onto the information recording medium 320 via the drive 307 under control of the control unit 303.

Note that an example in which information indicating, for example, the type of recorded data, specifically, the non-VR image other than VR images, the VR image of type 1, the VR image of type 2, and the like is included is input via the user input unit 302 has been described above. However, a configuration in which the control unit 303 acquires these pieces of information from, for example, metadata input together with the data for record 331 input from the data input unit 301 may be employed.

Alternatively, a configuration in which the control unit 303 analyzes the data for record 331 input from the data input unit 301 and acquires the image type information may be employed.

Next, a sequence of data recording processing on the information recording medium 320 that is executed by the image processing device 300 illustrated in FIG. 34 will be described with reference to a flowchart illustrated in FIG. 35.

Figure 35:
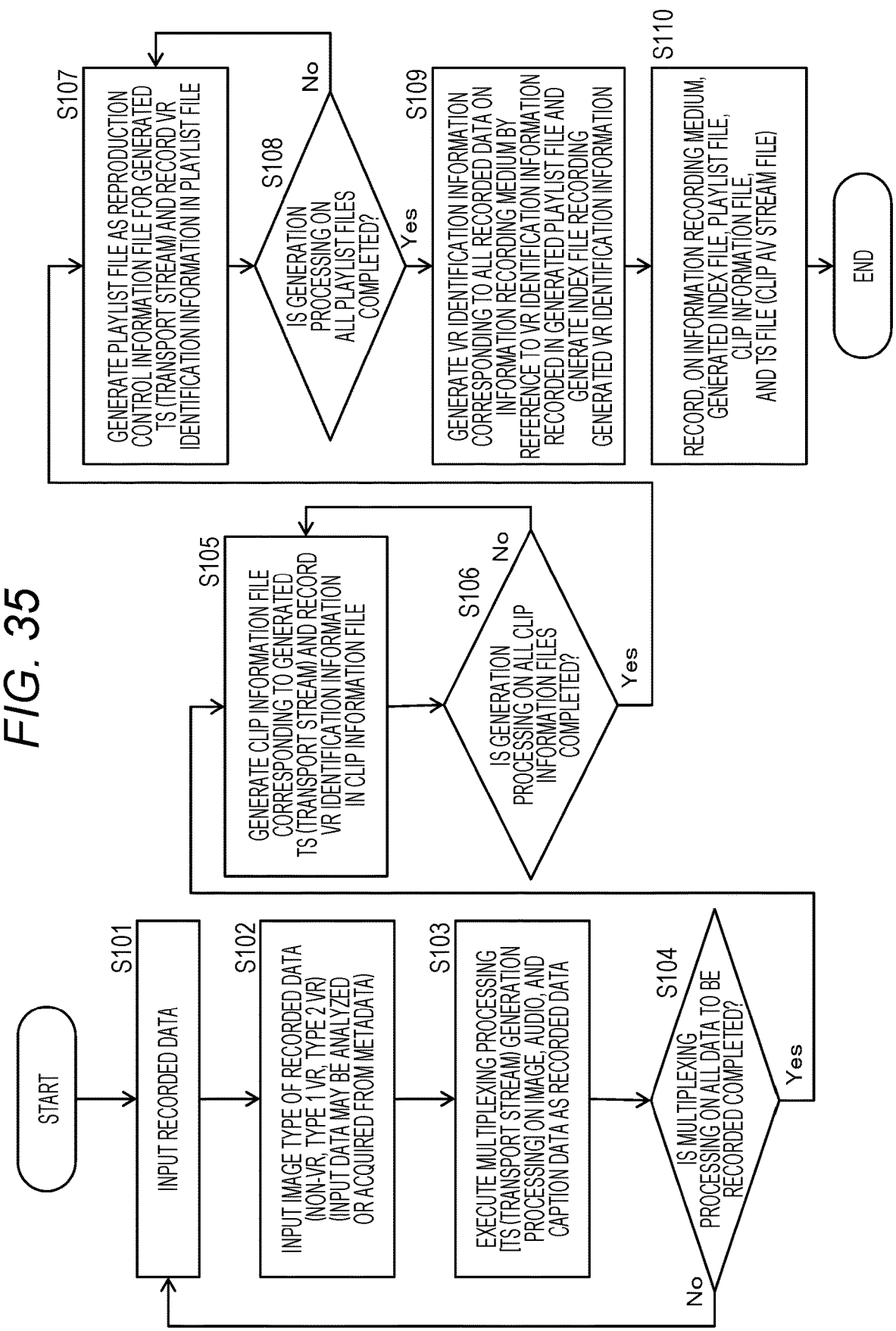
FIG. 35 is a diagram illustrating a flowchart illustrating a processing sequence to be executed by the image processing device executes data recording on the information recording medium.

Processing according to the flowchart illustrated in FIG. 35 can be executed under control of a data processing unit (control unit) including a CPU having a program execution function, for example, according to a program stored in a storage unit of an image processing device.

Processing of steps illustrated in the flow of FIG. 35 will be sequentially described below.

(Step S101)

First, in step S101, the image processing device 300 receives data for record through the data input unit 301.

The data for record includes image data, audio data, caption data, and the like.

The image data includes, for example, the non-VR image other than VR images, the VR image of type 1, the VR image of type 2, and the like.

(Step S102)

Next, in step S102, the control unit 303 detects image type information input from the user input unit 302.

Specifically, it is detected which one of the VR image of type 1, the VR image of type 2, and the non-VR image other than VR images is included as the image type of recorded data.

Note that, as described above, the image type information may be acquired from metadata, or may be acquired by analyzing the input image data.

(Step S103)

Next, in step S103, multiplexing processing [TS (transport stream) generation processing] for image, audio, and caption data as recorded data is executed.

This is processing executed by the multiplexing processing unit 305 illustrated in FIG. 34.

The multiplexer (MUX) 314 of the multiplexing processing unit 305 receives caption, image, and audio data acquired by the caption data acquisition unit 311, the image data acquisition unit 312, and the audio data acquisition unit 313, and generates a transport stream (TS file) storing these pieces of data. Specifically, for example, the clip AV stream file described above with reference to FIG. 5 and the like is generated.

(Step S104)

In step S104, the control unit 303 determines whether the multiplexing processing for all recorded data is finished. If there is unprocessed data, the processing from step S101 is repeated.

If it is determined that the multiplexing processing on all recorded data is finished, the processing proceeds to step S105.

(Step S105)

Next, in step S105, the control unit 303 generates a clip information file corresponding to the generated TS (transport stream), and records VR identification information or the like in the clip information file.

Specifically, for example, the clip information file recording VR identification information or the like as described above with reference to FIGS. 21 to 26 is generated.

(Step S106)

In step S106, the control unit 303 determines whether the generation processing for all clip information has completed. If the processing has not completed, the processing of step S105 is repeated.

If it is determined that the generation processing on all clip information files has completed, the processing proceeds to step S107.

(Step S107)

Next, in step S107, the control unit 303 generates the playlist file as the generated TS (Transport Stream) reproduction control information file, and records VR identification information or the like in the playlist file.

Specifically, for example, the playlist file recording VR identification information or the like as described above with reference to FIGS. 12 to 20 is generated.

(Step S108)

Next, in step S108, the control unit 303 determines whether the generation processing on all playlist files has completed. If the processing has not completed, the processing of step S107 is repeated.

If it is determined that the generation processing on all playlist files has completed, the processing proceeds to step S109.

(Step S109)

Next, in step S109, the control unit 303 generates VR identification information corresponding to all recorded data on the information recording medium by referring to the VR identification information recorded on the generated playlist file, and generates an index file recording the generated VR identification information.

Specifically, for example, the index file recording VR identification information or the like as described above with reference to FIGS. 8 to 11 is generated.

(Step S110)

Next, in step S110, the control unit 303 records, in the information recording medium, the database file such as the generated index file, playlist file or clip information file, and the TS file (clip AV stream file).

As described above with reference to FIG. 34, the recording unit 306 outputs and records the files onto the information recording medium 320 via the drive 307 under control of the control unit 303.

By the series of processing described above, the information recording medium recording the database file, such as the index file, the playlist file, and the clip information file, in which VR identification information or the like is recorded, and the TS file (clip AV stream file) recording image data of any one of the non-VR image other than VR images, the VR image of type 1, the VR image of type 2, or the like is completed.

6. Regarding the Configuration and Processing of the Image Processing Device that Executes Reproduction Processing on Data from the Information Recording Medium Next, the configuration and processing of the image processing device that executes reproduction processing on data from the information recording medium will be described with reference to FIGS. 36 and 37.

As described above with reference to FIG. 4, in order to implement a normal display of images on the display device 30 illustrated in FIG. 4, processing or the like in which the reproduction device 20 confirms the type of image data recorded on the mounted information recording medium (BD)10, i.e., which one of the image types of the VR image of type 1, the VR image of type 2, and the non-VR image other than VR images is recorded, and further acquires display function information about the display device is required.

The reproduction device 20 according to the present disclosure confirms, on the basis of the VR identification information or the like recorded in the database file, such as the index file, the playlist file, or the clip information file, the type of image data recorded on the mounted information recording medium (BD) 10, i.e., which one of the image types of the VR image of type 1, the VR image of type 2, and the non-VR image other than VR images is recorded.

Further, as described above with reference to FIG. 27, the reproduction device 20 receives, from the display device 30, the display device function information such as the EDID, and further outputs, to the display device 30, the reproduction data information such as the info frame.

These processings are executed, thereby implementing a normal display of images on the display device 30.

The configuration and processing sequence of the image processing device serving as an information recording medium reproduction device that implements this normal image display processing will be described below.

Figure 36:
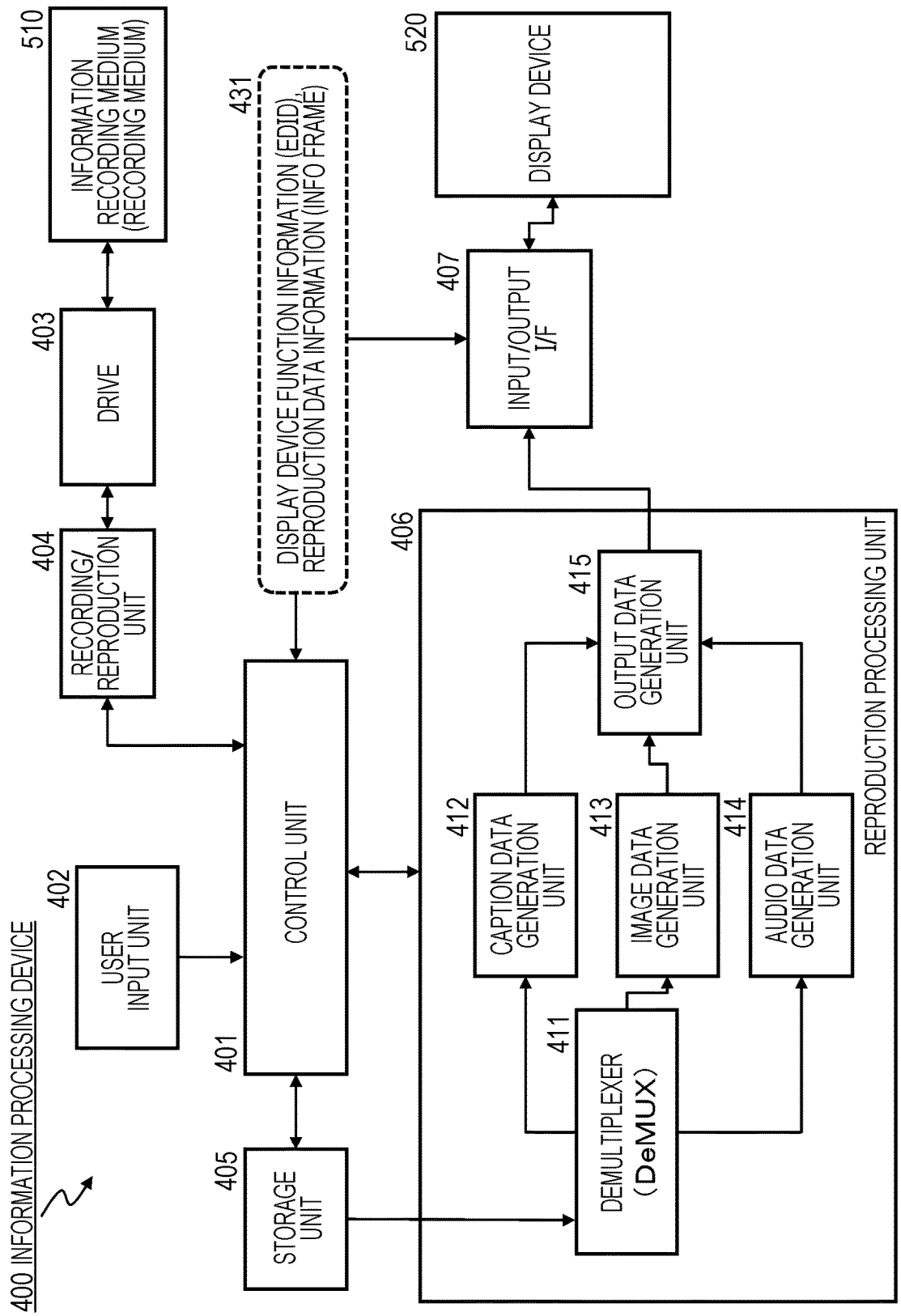
FIG. 36 is a diagram illustrating a configuration of an image processing device that executes data reproduction from the information recording medium.

FIG. 36 illustrates a configuration of an image processing device 400 that executes reproduction processing on data recorded on an information recording medium such as a BD.

The image processing device 400 reads data recorded on an information recording medium (recording medium) 510 illustrated in FIG. 36, and outputs the data to the display device 520. Note that the display device 20 is a display device, such as a television, for example, and includes a display, a speaker, and the like.

The information recording medium (recording medium) 510 is, for example, a disk recording data according to a BD format, and records the clip AV stream file (=transport stream file) as multiplexing data of image, audio, and caption data, as well as the database file, such as the index file, the playlist file, and the clip information file, and the like.

The clip AV stream file stores image data including at least one of the image types of the non-VR image other than VR images, the VR image of type 1, and the VR image of type 2. In addition, in each of the index file, the playlist file, and the clip information file, the VR identification information described above is recorded.

The control unit 401 reads recorded data on the information recording medium 510 through the recording/reproducing unit 404 and the drive 403 on the basis of the input of, for example, the reproduction instruction information from the user input unit 402, stores the recorded data in a storage unit 405 as a data buffer, and outputs the stored data to a reproduction processing unit 406.

Further, the control unit 401 executes communication with the display device 520 through an input/output interface 407.

The control unit 401 of the image processing device 400 receives, for example, the display device function information, such as the EDID, as described above with reference to FIGS. 27 to 33 from the display device 520.

Further, the control unit 401 analyzes the VR identification information recorded on the database file, such as the index file, the playlist file, or the clip information file, which is read from the information recording medium 510, stores, in the info frame, reproduction data information required for display processing for reproduction data on the display device 520, and transmits the reproduction data information to the display device 520.

The reproduction processing unit 406 acquires each data from the clip AV stream file storing reproduction data, i.e., image, audio, caption data, and the like which is read from the information recording medium 510, under control of the control unit 401, thereby generating the reproduction data.

A demultiplexer (DeMUX) 411 acquires data storing packets constituting the clip AV stream file storing data such as image, audio, and caption data, classifies the data into data type packets, and outputs the packets to a caption data generation unit 412, an image data generation unit 413, and an audio data generation unit 414 depending on the data type.

The caption data generation unit 412, the image data generation unit 413, and the audio data generation unit 414 execute decoding processing or the like on the data stored in the packets, and output the decoded data to an output data generation unit 415.

The output data generation unit 415 outputs the caption, image, and audio data to the display device 520 through the input/output interface 407.

Note that the output data generation unit 415 executes image conversion processing, as needed, to convert, for example, the VR image of type 1 into the non-VR image other than VR images, under control of the control unit 401.

Specifically, in a case where the display device 520 is a non-VR-image-compliant television, when the VR image of type 1 is output, the display device 520 cannot display the VR image.

In this case, the output data generation unit 415 generates the non-VR image by executing processing for converting the VR image of type 1 into the non-VR image other than the VR image, and outputs the non-VR image data other than the VR image to the display device 520.

The display device 520 executes output data generation processing, such as output image generation processing for generating a VR image or a non-VR image, for example, on each piece of data, such as a caption, image, or audio, which is input from the image processing device 400, depending on the characteristics and functions of the display device 520, generates output data depending on the functions of the display device 520, and outputs the output data.

Note that the control unit 401 of the image processing device 400 controls the reproduction data generated in the reproduction processing unit 406 according to the display device function information received from the display device 520.

Further, in a case where the display device function information received from the display device 520 indicates that the data stored in the information recording medium 510 cannot be reproduced or displayed, for example, the processing is stopped without executing the reproduction data generation. Note that in this case, the control unit 401 of the image processing device 400 may be configured to perform processing for outputting a notification message indicating that the data cannot be reproduced on the display device 520.

Next, a sequence of data reproduction processing from the information recording medium 510 that is executed by the image processing device 400 illustrated in FIG. 36 will be described with reference to a flowchart illustrated in FIG. 37.

Figure 37:
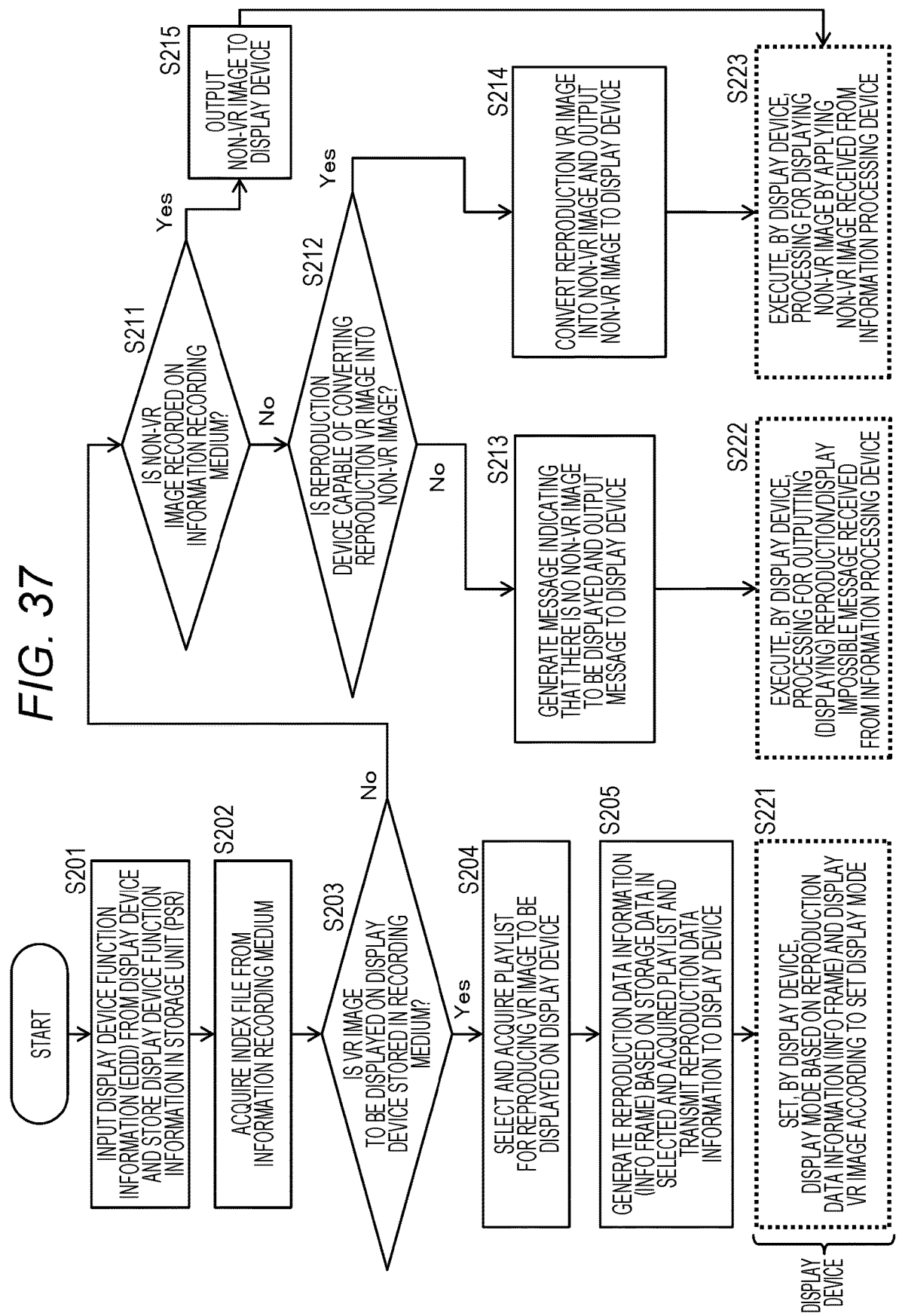
FIG. 37 is a diagram illustrating a flowchart illustrating a processing sequence to be executed by the image processing device that executes data reproduction from the information recording medium.

Processing according to the flowchart illustrated in FIG. 37 can be executed under control of a data processing unit (control unit) including a CPU having a program execution function, for example, according to a program stored in a storage unit of an image processing device 400.

Processing of steps illustrated in the flow of FIG. 37 will be sequentially described below.

(Step S201)

First, in step S201, the image processing device 400 receives the display device function information (EDID) from the display device 520, and stores the display device function information in the storage unit (PSR).

This processing is the processing described above with reference to FIGS. 27 to 30. When a communication connection between the image processing device (reproduction device) 400 and the display device 520 is established, the display device 520 outputs function information or the like about the display device 520 to the image processing device 400. Specifically, as illustrated in FIG. 27, for example, an EDID (Extended Display Identification Data) 201 defined in HDMI (Registered Mark) is output. The EDID includes display device function information such as information indicating the type of images that can be output from the display device 520.

As described above with reference to FIG. 29, the display device function information includes information indicating, for example, the reproduction function for which one of the VR image of type 1, the VR image of type 2, and the non-VR image other than VR images, is included in the display device 520.

The image processing device 400 stores the reproduction function information received from the display device 520 in the storage unit (PSR). For example, the reproduction function information is stored in the storage unit (PSR) as described above with reference to FIG. 30.

(Step S202)

Next, in step S202, the image processing device 400 acquires the index file from the information recording medium.

In the index file, for example, the VR identification information described above with reference to FIGS. 8 to 11 is recorded.

(Step S203)

Next, in step S203, the image processing device 400 determines whether the VR image that can be displayed on the display device 520 is recorded in the information recording medium 510 on the basis of the VR identification information recorded in the index file read from the information recording medium 510 and the display device function information (EDID) received from the display device 520 in the previous step S201.

If it is determined that the VR image that can be displayed on the display device 520 is recorded on the information recording medium 510, the processing proceeds to step S204. If it is determined that the VR image that can be displayed on the display device 520 is not recorded on the information recording medium 510, the processing proceeds to step S211.

(Step S204)

In the determination processing of step S203, if it is determined that the VR image that can be displayed on the display device 520 is recorded on the information recording medium 510, the processing proceeds to step S204.

In step S204, a playlist for reproducing the VR image that can be displayed on the display device is selected and acquired.

The VR image that can be displayed on the display device is, for example, the VR image of type 1 or the VR image or type 2. Which one of the VR images can be displayed on the display device 520 is confirmed based on the display device function information received from the display device 520 in step S201.

The image processing device 400 selects and acquires a playlist as reproduction control information about the stream file storing the VR image that can be displayed on the display device 520.

(Step S205)

Next, in step S205, the image processing device 400 generates reproduction data information (info frame) on the basis of the data stored in the selected and acquired playlist, and transmits the reproduction data information to the display device 520.

The reproduction data information (info frame) is the reproduction data information (info frame) described above with reference to FIGS. 27 and 33.

As illustrated in FIG. 33, the info frame includes a plurality of fields, and various pieces of information recorded in each field unit is provided to the display device 520 from the image processing device (reproduction device) 400. This information is reproduction data information to be applied, by the display device 520, to, for example, display processing for a reproduction content input from the image processing device (reproduction device) 400. For example, the reproduction image data type (non-VR image/VR image of type 1/VR image of type 2) information is recorded.

(Step S221)

Processing of steps (steps S221 to S223) each indicated by a dotted frame as illustrated in FIG. 37 is processing executed in the display device 520.

In step S221, the display device 520 sets a display mode on the basis of the reproduction data information (info frame) received from the image processing device 400, and displays the VR image according to the set display mode.

(Step S211)

Next, in step S203, processing of step S211 and subsequent steps executed in a case where it is determined that the VR image that can be displayed on the display device 520 is not recorded on the information recording medium 510 will be described.

In step S211, the image processing device 400 determines whether the non-VR image other than VR images is recorded on the information recording medium 510.

This determination processing is carried out on the basis of the VR identification information in the index file read from the information recording medium 510 in step S202.

If it is confirmed that the non-VR image other than VR images is not recorded on the information recording medium 510, the processing proceeds to step S212.

On the other hand, if it is confirmed that the non-VR image other than VR images is recorded on the information recording medium 510, the processing proceeds to step S215.

(Step S212)

In the determination processing of step S211, if it is confirmed that the non-VR image other than VR images is not recorded on the information recording medium 510, the processing proceeds to step S212.

In step S212, the image processing device 400 determines whether the image processing device (reproduction device) 400 can convert the VR image for reproduction recorded on the information recording medium 510 into the non-VR image.

This is determined with reference to the image conversion function information stored in the storage unit (PSR 32) of the image processing device (reproduction device) 400 described above with reference to FIGS. 31 to 32.

If it is determined that the image processing device (reproduction device) 400 can convert the VR image for reproduction recorded on the information recording medium 510 into the non-VR image, the processing proceeds to step S214.

On the other hand, if it is confirmed that the image processing device (reproduction device) 400 cannot convert the VR image for reproduction recorded on the information recording medium 510 into the non-VR image, the processing proceeds to step S213.

(Step S213)

In the determination processing of step S212, if it is determined that the image processing device (reproduction device) 400 cannot convert the VR image for reproduction recorded on the information recording medium 510 into the non-VR image, the processing proceeds to step S213.

In step S213, the image processing device 400 generates a message indicating that there is no non-VR image that can be displayed, and outputs the message to the display device 520.

(Step S222)

The processing of step S222 is processing executed by the display device 520.

In step S222, the display device 520 executes processing for outputting (displaying) the message which is received from the image processing device 400 and indicates that there is no non-VR image that can be displayed.

(Step S214)

On the other hand, in the determination processing of step S212, if it is confirmed that the VR image for reproduction recorded on the information recording medium 510 can be converted into the non-VR image, the processing proceeds to step S214.

In this case, in step S214, the image processing device 400 converts the VR image for reproduction recorded on the information recording medium 510 into the non-VR image, and outputs the converted non-VR image to the display device 520.

(Step S223)

The processing of step S223 is processing executed by the display device 520.

In step S223, the display device 520 executes display processing for the non-VR image which is other than VR images and received from the image processing device 400.

(Step S215)

In step S211, if it is confirmed that the non-VR image other than VR images is recorded on the information recording medium 510, the processing proceeds to step S215.

In step S215, the image processing device 400 outputs the non-VR image data other than VR images to the display device.

(Step S223)

Also after the processing of step S215, the display device 520 executes processing of step S223.

In step S223, the display device 520 executes display processing for the non-VR image which is other than VR images and received from the image processing device 400.

7. Regarding a Configuration Example of the Image Processing Device

Next, a hardware configuration example of an image processing device that can be applied as an image processing device that executes data recording on an information recording medium and data reproduction from the information recording medium, a display device that displays reproduction data from the information recording medium, or an information recording medium manufacturing device will be described with reference to FIG. 38.

A CPU (Central Processing Unit) 601 functions as a data processing unit that executes various processing according to programs stored in a ROM (Read Only Memory) 602 or a storage unit 608. For example, processing according to the sequences described in the embodiments described above are executed. A RAM (Random Access Memory) 603 stores programs, data, and the like executed by the CPU 601. The CPU 601, the ROM 602, and the RAM 603 are connected to each other via a bus 604.

The CPU 601 is connected to an input/output interface 605 via the bus 604. An input unit 606, which includes various switches, a keyboard, a mouse, a microphone, and the like, and an output unit 607, which includes a display, a speaker, and the like are connected to the input/output interface 605. The CPU 601 executes various processing corresponding to instructions input from the input unit 606, and outputs the processing results to, for example, the output unit 607.

The storage unit 608 connected to the input/output interface 605 includes, for example, a hard disk and the like, and stores programs and various data executed by the CPU 601. A communication unit 609 functions as a transmission/reception unit for data communication via a network, such as the Internet or a local area network, and a transmission/reception unit for broadcast waves, and communicates with an external device.

A drive 610 which is connected to the input/output interface 605 drives a removable medium 611, such as a magnetic disk, an optical disk, a magnetooptical disk, or a semiconductor memory such as a memory card, and executes data recording or reading.

8. Summary of the Configuration of the Present Disclosure

Embodiments of the present disclosure have been described in detail above with reference to specific embodiments. However, it is obvious that those skilled in the art can make corrections or substitutions without departing from the scope of the present disclosure. That is, embodiments of the present invention are disclosed by way of example, and should not be interpreted in a limitative manner. To determine the scope of the present disclosure, the claims should be considered.

Note that the technique disclosed herein can have the following configurations.

(1) An image processing device including a data processing unit configured to execute reproduction processing for recorded data on an information recording medium, in which the data processing unit receives, from a display device configured to perform display processing on reproduction data supplied from the information recording medium, display device information including display function information about a virtual reality (VR) image, the VR image enabling selective display of images in different directions, the data processing unit acquires, from a database file recorded on the information recording medium, VR identification information indicating whether or not image data recorded on the information recording medium includes the VR image, and the data processing unit reads, from the information recording medium, image data that can be displayed on the display device on the basis of a result of comparison between the display device information and the VR identification information, and outputs the image data to the display device.

(2) The image processing device according to (1), in which the display device information is information including information indicating whether or not the display device has a display function for each of VR images having different image types of type 1 and type 2, and a non-VR image other than the VR images, the VR identification information is information including information indicating which one of the types of image data of the VR image of type 1, the VR image of type 2, and the non-VR image other than the VR images is stored in the information recording medium, and the data processing unit outputs one of the VR image to be displayed on the display device and the non-VR image on the basis of a result of comparison between the display device information and the VR identification information.

(3) The image processing device according to (1) or (2), in which in a case where it is confirmed, on the basis of the display device information, that the display device is a display device capable of displaying only the non-VR image other than the VR images and it is confirmed, on the basis of the VR identification information, that an image recorded on the information recording medium is the VR image, the data processing unit converts the VR image read from the information recording medium into the non-VR image and outputs the non-VR image to the display device.

(4) The image processing device according to (3), in which the data processing unit confirms whether it is possible to convert the VR image recorded on the information recording medium into the non-VR image by referring to image conversion function information stored in a storage unit, and in a case where it is confirmed that it is possible to convert the VR image into the non-VR image, the data processing unit converts the VR image read from the information recording medium into the non-VR image and outputs the non-VR image to the display device.

(5) The image processing device according to any one of (1) to (4), in which the database file is a data file of any one of an index file, a playlist file, and a clip information file defined in a Blu-ray (Registered Mark) disk format.

(6) The image processing device according to any one of (1) to (5), in which the data processing unit is configured to transmit, to the display device, reproduction data information to be applied to display processing for image data recorded on the information recording medium, and the reproduction data information includes VR identification information indicating which one of the types of the VR image of type 1, the VR image of type 2, and the non-VR image other than the VR images reproduction image data is.

(7) An image processing device including a data processing unit configured to execute data recording on an information recording medium, in which the data processing unit generates a database file storing VR identification information indicating which one of virtual reality (VR) images of type 1 and type 2, and a non-VR image other than the VR images is included as recording image data on the information recording medium, and records the database file on the information recording medium, the VR images enabling selective display of images in different directions.

(8) The image processing device according to (7), in which the database file is a data file of any one of an index file, a playlist file, and a clip information file defined in a Blu-ray (Registered Mark) disk format.

(9) The image processing device according to (8), in which the data processing unit records, in the index file, VR identification information about the entire recorded data on the information recording medium, the data processing unit records, in the playlist file, VR identification information about a unit of reproduction target data by the playlist file, and the data processing unit records, in the clip information file, VR identification information about a unit of reproduction data associated with the clip information file.

(10) An information recording medium including:
a reproduction data file storing image data; and
a database file storing VR identification information as recorded data, the VR identification information indicating which one of virtual reality (VR) images of type 1 and type 2, and a non-VR image other than the VR images is included as image data stored in the reproduction data file, the VR images enabling selective display of images in different directions, in which a reproduction device is capable of selectively reproducing image data of a type suitable for a display function of a display device configured to display reproduction data by referring to the VR identification information.

(11) The information recording medium according to (10), in which the database file is a data file of any one of an index file, a playlist file, and a clip information file defined in a Blu-ray (Registered Mark) disk format.

(12) The information recording medium according to (11), in which the index file is configured to store VR identification information about the entire recorded data on the information recording medium, the playlist file is configured to store VR identification information about a unit of reproduction target data by the playlist file, and the clip information file is configured to store VR identification information about a unit of reproduction data associated with the clip information file.

(13) A display device including:
a communication unit configured to execute data transmission to/reception from a reproduction device configured to execute reproduction processing for recorded data on an information recording medium; and a data processing unit, in which
the data processing unit generates display device information including display function information about a virtual reality (VR) image and outputs the display device information to the reproduction device, the VR image enabling selective display of images in different directions.

(14) The display device according to (13), in which the display device information is information including information indicating whether or not the display device has a display function for each of VR images having different image types of type 1 and type 2, and a non-VR image other than the VR images.

(15) An image processing method to be executed in an image processing device, the image processing device including a data processing unit configured to execute reproduction processing for recorded data on an information recording medium, in which the data processing unit receives, from a display device configured to perform display processing on reproduction data supplied from the information recording medium, display device information including display function information about a virtual reality (VR) image, the VR image enabling selective display of images in different directions, the data processing unit acquires, from a database file recorded on the information recording medium, VR identification information indicating whether or not image data recorded on the information recording medium includes the VR image, and the data processing unit reads, from the information recording medium, image data that be displayed on the display device on the basis of a result of comparison between the display device information and the VR identification information, and outputs the image data to the display device.

(16) An image processing method to be executed in an image processing device, the image processing device including a data processing unit configured to execute data recording on an information recording medium, in which the data processing unit generates a database file storing VR identification information indicating which one of virtual reality (VR) images of type 1 and type 2, and a non-VR image other than the VR images is included as recording image data on the information recording medium, and records the database file on the information recording medium, the VR images enabling selective display of images in different directions.

(17) An image processing method to be executed in a display device, the display device including:

a communication unit configured to execute data transmission to/reception from a reproduction device configured to execute reproduction processing for recorded data on an information recording medium; and a data processing unit, in which the data processing unit generates display device information including display function information about a virtual reality (VR) image and outputs the display device information to the reproduction device, the VR image enabling selective display of images in different directions.

(18) A program for causing an image processing device to execute information processing, the image processing device including a data processing unit configured to execute reproduction processing for recorded data on an information recording medium, the program causes the data processing unit to execute:

processing for receiving, from a display device configured to perform display processing on reproduction data supplied from the information recording medium, display device information including display function information about a virtual reality (VR) image, the VR image enabling selective display of images in different directions;

processing for acquiring, from a database file recorded on the information recording medium, VR identification information indicating whether or not image data recorded on the information recording medium includes the VR image; and processing for reading, from the information recording medium, image data that can be displayed on the display device on the basis of a result of comparison between the display device information and the VR identification information, and outputting the image data to the display device.

(19) A program for causing an image processing device to execute information processing, the image processing device including a data processing unit configured to execute data recording on an information recording medium, the program causing the data processing unit to execute processing for generating a database file storing VR identification information indicating which one of virtual reality (VR) images of type 1 and type 2, and a non-VR image other than the VR images is included as recording image data on the information recording medium, and recording the database file on the information recording medium, the VR images enabling selective display of images in different directions.

(20) A program for causing a display device to execute image processing, the display device including:

a communication unit configured to execute data transmission to/reception from a reproduction device configured to execute reproduction processing for recorded data on an information recording medium; and a data processing unit, the program causing the data processing unit to execute processing for generating display device information including display function information about a virtual reality (VR) image and outputting the display device information to the reproduction device, the VR image enabling selective display of images in different directions.

In addition, a series of processing described herein can be executed by hardware, or software, or a composite configuration using a combination of hardware and software. In the case of executing the processing by software, the processing can be executed by installing a program recording a processing sequence in a memory provided in a computer incorporated in dedicated hardware, or by installing a program in a general-purpose computer capable of executing various processing. For example, the program can be preliminarily recorded on a recording medium. In addition to installing the program in a computer from a recording medium, the program can be received via a network, such as a LAN (Local Area Network) or the Internet, and can be installed in a recording medium such as a built-in hard disk.

Note that various processing described herein is executed in chronological order in accordance with the description, but instead may be executed in parallel or individually depending on the throughput of a device to execute the processing, or as needed. In addition, a system described herein refers to a logical set of a plurality of devices and is not limited to a configuration in which devices having the respective configurations are present in the same casing.

INDUSTRIAL APPLICABILITY

As described above, according to an embodiment of the present disclosure, an image that can be displayed is acquired from a recording medium according to the type of an image stored in an information recording medium and display function information about the display device, and the image is output to the display device.

Specifically, a data processing unit the executes data reproduction from an information recording medium inputs image display function information, such as type information about a VR image to be displayed from a display device that performs reproduction data display processing, acquires, from a database file recorded on the information recording medium, VR identification information indicating which one of a VR image of type 1, a VR image of type 2, and a non-VR image other than the VR images is included in the information recording medium, reads, from the information recording medium, image data that can be displayed on the display device on the basis of a result of comparison between the acquired display device function information and VR identification information, and outputs the image data to the display device.

This configuration enables implementation of a configuration for acquiring an image to be displayed from a recording medium according to an image type stored in the information recording medium and display function information about the display device, and outputting the image to the display device.

REFERENCE SIGNS LIST

1 Image data
2 Mobile terminal
3 Speaker
5 Head mount display (HMD)
6 Speaker
10 Information recording medium (disk)
20 Reproduction device
30 Display device
51 Management information setting unit
52 Data unit 300 Image processing device
301 Data input unit
302 User input unit
303 Control unit
304 Storage unit
305 Multiplexing processing unit
306 Recording unit
307 Drive
308 Information recording medium
311 Caption data acquisition unit
312 Image data acquisition unit
313 Audio data acquisition unit
314 Multiplexer
400 Image processing device
401 Control unit
402 User input unit
403 Drive
404 Recording/reproducing unit
405 Storage unit
406 Reproduction processing unit
407 Input/output I/F
411 Demultiplexer
412 Caption data generation unit
413 Image data generation unit
414 Audio data generation unit
415 Output data generation unit
510 Information recording medium
520 Display device
601 CPU
602 ROM
603 RAM
604 Bus
605 Input/output interface
606 Input unit
607 Output unit
608 Storage unit
609 Communication unit
610 Drive
611 Removable medium

The invention claimed is:

1. An image processing device comprising
a data processing unit configured to execute reproduction processing for recorded data on an information recording medium, wherein
the data processing unit receives, from a display device configured to perform display processing on reproduction data supplied from the information recording medium, display device information including display function information about whether the display device is capable of displaying a virtual reality (VR) image, the VR image enabling selective display of images in different directions,
the data processing unit acquires, from a database file recorded on the information recording medium, VR identification information indicating whether or not image data recorded on the information recording medium includes the VR image,
the data processing unit reads, from the information recording medium, image data that can be displayed on the display device on the basis of a result of comparison between the display device information and the VR identification information, and outputs the image data to the display device,
the database file is a data file of any one of an index file, a playlist file, and a clip information file defined in a BDMV disk format,
VR identification information about an entire recorded data on the information recording medium is recorded in the index file, and
the data processing unit is implemented via at least one processor.

2. The image processing device according to claim 1, wherein
the display device information includes information indicating whether or not the display device has a display function for each of VR images having different image types of type 1 and type 2, and a non-VR image other than the VR images,
the VR identification information includes information indicating which one of the types of image data of the VR image of type 1, the VR image of type 2, and the non-VR image other than the VR images is stored in the information recording medium, and
the data processing unit outputs one of the VR image to be displayed on the display device and the non-VR image on the basis of a result of comparison between the display device information and the VR identification information.

3. The image processing device according to claim 1, wherein in a case where it is confirmed, on the basis of the display device information, that the display device is a display device capable of displaying only the non-VR image other than the VR images and it is confirmed, on the basis of the VR identification information, that an image recorded on the information recording medium is the VR image, the data processing unit converts the VR image read from the information recording medium into the non-VR image and outputs the non-VR image to the display device.

4. The image processing device according to claim 3, wherein the data processing unit confirms whether it is possible to convert the VR image recorded on the information recording medium into the non-VR image by referring to image conversion function information stored in a storage unit, and in a case where it is confirmed that it is possible to convert the VR image into the non-VR image, the data processing unit converts the VR image read from the information recording medium into the non-VR image and outputs the non-VR image to the display device.

5. The image processing device according to claim 2, wherein
the data processing unit is configured to transmit, to the display device, reproduction data information to be applied to display processing for image data recorded on the information recording medium, and
the reproduction data information includes VR identification information indicating reproduction image data is which one of the types of the VR image of type 1, the VR image of type 2, and the non-VR image other than the VR images.

6. An image processing device comprising
a data processing unit configured to execute data recording on an information recording medium, wherein
the data processing unit generates a database file storing VR identification information indicating which one of virtual reality (VR) images of type 1 and type 2, and a non-VR image other than the VR images is included as recording image data on the information recording medium, and records the database file on the information recording medium, the VR images enabling selective display of images in different directions,
the database file is a data file of any one of an index file, a playlist file, and a clip information file defined in a BDMV disk format, the data processing unit records, in the index file, VR identification information about an entire recorded data on the information recording medium, and the data processing unit is implemented via at least one processor.

7. The image processing device according to claim 6, wherein the data processing unit records, in the playlist file, VR identification information about a unit of reproduction target data by the playlist file, and the data processing unit records, in the clip information file, VR identification information about a unit of reproduction data associated with the clip information file.

8. A non-transitory computer-readable information recording medium comprising:

a reproduction data file storing image data; and a database file storing VR identification information as recorded data, the VR identification information indicating which one of virtual reality (VR) images of type 1 and type 2, and a non-VR image other than the VR images is included as image data stored in the reproduction data file, the VR images enabling selective display of images in different directions, wherein a reproduction device is capable of selectively reproducing image data of a type suitable for a display function of a display device configured to display reproduction data by referring to the VR identification information, the database file is a data file of any one of an index file, a playlist file, and a clip information file defined in a BDMV disk format, and the index file is configured to store VR identification information about an entire recorded data on the information recording medium.

9. The information recording medium according to claim 8, wherein the playlist file is configured to store VR identification information about a unit of reproduction target data by the playlist file, and the clip information file is configured to store VR identification information about a unit of reproduction data associated with the clip information file.

10. A display device comprising:

a communication unit configured to execute data transmission to/reception from a reproduction device configured to execute reproduction processing for recorded data on an information recording medium; and a data processing unit, wherein the data processing unit generates display device information including display function information about whether the display device is capable of displaying a virtual reality (VR) image and outputs the display device information to the reproduction device, the VR image enabling selective display of images in different directions, the database file is a data file of any one of an index file, a playlist file, and a clip information file defined in a BDMV disk format, the index file is configured to store VR identification information about an entire recorded data on the information recording medium, and the communication unit and the data processing unit are each implemented via at least one processor.

11. The display device according to claim 10, wherein the display device information includes information indicating whether or not the display device has a display function for each of VR images having different image types of type 1 and type 2, and a non-VR image other than the VR images.

12. An image processing method to be executed in an image processing device, the method comprising:

executing reproduction processing for recorded data on an information recording medium;

receiving, from a display device configured to perform display processing on reproduction data supplied from the information recording medium, display device information including display function information about whether the display device is capable of displaying a virtual reality (VR) image, the VR image enabling selective display of images in different directions;

acquiring, from a database file recorded on the information recording medium, VR identification information indicating whether or not image data recorded on the information recording medium includes the VR image; and reading, from the information recording medium, image data that can be displayed on the display device on the basis of a result of comparison between the display device information and the VR identification information, and outputs the image data to the display device, wherein the database file is a data file of any one of an index file, a playlist file, and a clip information file defined in a BDMV disk format, and VR identification information about an entire recorded data on the information recording medium is recorded in the index file.

13. An image processing method to be executed in an image processing device, the method comprising:

executing data recording on an information recording medium;

generating a database file storing VR identification information indicating which one of virtual reality (VR) images of type 1 and type 2, and a non-VR image other than the VR images is included as recording image data on the information recording medium, and records the database file on the information recording medium, the VR images enabling selective display of images in different directions, wherein the database file is a data file of any one of an index file, a playlist file, and a clip information file defined in a BDMV disk format; and recording, in the index file, VR identification information about an entire recorded data on the information recording medium.

14. An image processing method to be executed in a display device, method comprising:

executing data transmission to/reception from a reproduction device configured to execute reproduction processing for recorded data on an information recording medium; and generating display device information including display function information about whether the display device is capable of displaying a virtual reality (VR) image and outputs the display device information to the reproduction device, the VR image enabling selective display of images in different directions, wherein the database file is a data file of any one of an index file, a playlist file, and a clip information file defined in a BDMV disk format, and the index file is configured to store VR identification information about an entire recorded data on the information recording medium.

15. A non-transitory computer-readable medium having embodied thereon a program, which when executed by a computer causes the computer to execute a method, the method comprising:
   executing reproduction processing for recorded data on an information recording medium;
   receiving, from a display device configured to perform display processing on reproduction data supplied from the information recording medium, display device information including display function information about whether the display device is capable of displaying a virtual reality (VR) image, the VR image enabling selective display of images in different directions;
   acquiring, from a database file recorded on the information recording medium, VR identification information indicating whether or not image data recorded on the information recording medium includes the VR image; and
   reading, from the information recording medium, image data that can be displayed on the display device on the basis of a result of comparison between the display device information and the VR identification information, and outputting the image data to the display device, wherein
   the database file is a data file of any one of an index file, a playlist file, and a clip information file defined in a BDMV disk format, and
   VR identification information about an entire recorded data on the information recording medium is recorded in the index file.

16. A non-transitory computer-readable medium having embodied thereon a program, which when executed by a computer causes the computer to execute a method, the method comprising:
   executing data recording on an information recording medium;
   generating a database file storing VR identification information indicating which one of virtual reality (VR) images of type 1 and type 2, and a non-VR image other than the VR images is included as recording image data on the information recording medium, and recording the database file on the information recording medium, the VR images enabling selective display of images in different directions, wherein the database file is a data file of any one of an index file, a playlist file, and a clip information file defined in a BDMV disk format; and
   recording, in the index file, VR identification information about an entire recorded data on the information recording medium.

17. A non-transitory computer-readable medium having embodied thereon a program, which when executed by a computer causes the computer to execute a method, the method comprising:
   causing a display device to execute image processing;
   executing data transmission to/reception from a reproduction device configured to execute reproduction processing for recorded data on an information recording medium; and
   generating display device information including display function information about whether the display device is capable of displaying a virtual reality (VR) image and outputting the display device information to the reproduction device, the VR image enabling selective display of images in different directions, wherein
   the database file is a data file of any one of an index file, a playlist file, and a clip information file defined in a BDMV disk format, and
   the index file is configured to store VR identification information about an entire recorded data on the information recording medium.

\* \* \* \* \*